(12) United States Patent
Khemani et al.

(10) Patent No.: US 7,297,394 B2
(45) Date of Patent: Nov. 20, 2007

(54) BIODEGRADABLE FILMS AND SHEETS SUITABLE FOR USE AS COATINGS, WRAPS AND PACKAGING MATERIALS

(75) Inventors: Kishan Khemani, Santa Barbara, CA (US); Harald Schmidt, Emmerich (DE); Simon K. Hodson, Santa Barbara, CA (US)

(73) Assignee: bio-tec Biologische Naturverpackungen GmbH & Co. KG, Emmerich (DE)

( * ) Notice: Subject to any disclaimer, the term of this patent is extended or adjusted under 35 U.S.C. 154(b) by 0 days.

(21) Appl. No.: 10/087,718

(22) Filed: Mar. 1, 2002

(65) Prior Publication Data

US 2003/0166748 A1    Sep. 4, 2003

(51) Int. Cl.
   B32B 27/00    (2006.01)
   B32B 33/00    (2006.01)

(52) U.S. Cl. .......................... 428/220; 428/69; 428/72; 428/98; 428/105; 428/113; 428/131; 428/219; 420/304.4; 420/306.6; 420/315.5; 420/323; 420/327

(58) Field of Classification Search ................ 428/219, 428/220, 72, 69, 98, 105, 113, 131, 304.4, 428/306.6, 315.5, 323, 327
See application file for complete search history.

(56) References Cited

U.S. PATENT DOCUMENTS

| | | |
|---|---|---|
| 4,318,950 A | 3/1982 | Takashi et al. |
| 4,364,985 A | 12/1982 | Tokuyama et al. |
| 4,536,531 A | 8/1985 | Ogawa et al. |
| 5,053,482 A | 10/1991 | Tietz |
| 5,080,665 A | 1/1992 | Jarrett et al. ................. 606/219 |
| 5,097,004 A | 3/1992 | Gallagher et al. |
| 5,097,005 A | 3/1992 | Tietz |
| 5,124,371 A | 6/1992 | Tokiwa et al. |
| 5,171,308 A | 12/1992 | Gallagher et al. |
| 5,200,247 A | 4/1993 | Wu et al. |
| 5,219,646 A | 6/1993 | Gallagher et al. |
| 5,234,977 A | 8/1993 | Bastioli et al. |
| 5,236,762 A | 8/1993 | Suzuki et al. |
| 5,252,642 A | 10/1993 | Sinclair et al. ............. 524/108 |
| 5,254,607 A | 10/1993 | McBride et al. |
| 5,258,430 A | 11/1993 | Bastioli et al. |
| 5,262,458 A | 11/1993 | Bastioli et al. |
| 5,280,055 A | 1/1994 | Tomka |
| 5,286,770 A | 2/1994 | Bastioli et al. |
| 5,288,765 A | 2/1994 | Bastioli et al. |
| 5,292,782 A | 3/1994 | Bastioli et al. |
| 5,292,783 A | 3/1994 | Buchanan et al. |
| 5,295,985 A | 3/1994 | Romesser et al. |
| 5,296,229 A | 3/1994 | Grandjean |
| 5,314,934 A | 5/1994 | Tomka |
| 5,354,616 A | 10/1994 | Fish, Jr. et al. |
| 5,360,830 A | 11/1994 | Bastioli et al. |
| 5,362,777 A | 11/1994 | Tomka |
| 5,374,259 A * | 12/1994 | Takahashi et al. .......... 604/367 |
| 5,407,979 A | 4/1995 | Wu et al. |
| 5,412,005 A | 5/1995 | Bastioli et al. |
| 5,415,827 A | 5/1995 | Tomka et al. |
| 5,422,387 A | 6/1995 | Toms et al. |
| 5,444,107 A | 8/1995 | Ajioka et al. |
| 5,446,079 A | 8/1995 | Buchanan et al. |
| 5,462,980 A | 10/1995 | Bastioli et al. |
| 5,462,982 A | 10/1995 | Bastioli et al. |
| 5,512,378 A | 4/1996 | Bastioli et al. |
| 5,525,281 A | 6/1996 | Lörcks et al. |
| 5,534,150 A | 7/1996 | Bastioli et al. |
| 5,550,173 A | 8/1996 | Hammond et al. |
| 5,559,171 A | 9/1996 | Buchanan et al. |
| 5,569,692 A | 10/1996 | Bastioli et al. |

(Continued)

FOREIGN PATENT DOCUMENTS

EP    0 400 532 A1    12/1990

(Continued)

OTHER PUBLICATIONS

U.S. Appl. No. 09/210,539, filed Dec. 14, 1998, Ishibashi et al.

(Continued)

Primary Examiner—Ana Woodward
(74) Attorney, Agent, or Firm—Workman Nydegger

(57) ABSTRACT

Biodegradable polymer blends suitable for laminate coatings, wraps and other packaging materials are manufactured from at least one "hard" biopolymer and at least one "soft" biopolymer. "Hard" biopolymers tend to be more brittle and rigid and typically have a glass transition temperature greater than about 10° C. "Soft" biopolymers tend to be more flexible and pliable and typically have a glass transition temperature less than about 0° C. While hard and soft polymers each possess certain intrinsic benefits, certain blends of hard and soft polymers have been discovered which possess synergistic properties superior to those of either hard or soft polymers by themselves. Biodegradable polymers include polyesters, polyesteramides, polyesterurethanes, thermoplastic starch, and other natural polymers. The polymer blends may optionally include an inorganic filler. Films and sheets made from the polymer blends may be textured so as to increase the bulk hand feel. Wraps will typically be manufactured to have good "dead-fold" properties so as to remain in a wrapped position and not spring back to an "unwrapped" form.

35 Claims, 9 Drawing Sheets

U.S. PATENT DOCUMENTS

| | | | |
|---|---|---|---|
| 5,580,911 A | 12/1996 | Buchanan et al. | |
| 5,589,518 A | 12/1996 | Bastioli et al. | |
| 5,599,858 A | 2/1997 | Buchanan et al. | |
| 5,663,216 A | 9/1997 | Tomka | |
| 5,700,344 A | 12/1997 | Edgington et al. | |
| 5,700,901 A | 12/1997 | Hurst et al. | 528/354 |
| 5,705,536 A | 1/1998 | Tomka | |
| 5,726,220 A | 3/1998 | Tokushige et al. | |
| 5,760,144 A | 6/1998 | Ozeki et al. | |
| 5,766,748 A | 6/1998 | Ikado et al. | |
| 5,770,137 A | 6/1998 | Lörcks et al. | |
| 5,783,271 A | 7/1998 | Nishida et al. | |
| 5,786,408 A | 7/1998 | Kuroda et al. | |
| 5,817,721 A | 10/1998 | Warzelhan et al. | |
| 5,821,286 A | 10/1998 | Xu et al. | |
| 5,844,023 A | 12/1998 | Tomka | |
| 5,866,634 A | 2/1999 | Tokushige et al. | |
| 5,883,199 A | 3/1999 | McCarthy et al. | |
| 5,897,944 A | 4/1999 | Loercks et al. | |
| 5,900,322 A | 5/1999 | Buchanan et al. | |
| 5,910,350 A | 6/1999 | Loracks et al. | |
| 5,910,545 A | 6/1999 | Tsai et al. | |
| 5,916,950 A | 6/1999 | Obuchi et al. | |
| 6,054,218 A | 4/2000 | Nucci et al. | |
| 6,062,228 A | 5/2000 | Loercks et al. | |
| 6,096,809 A * | 8/2000 | Lorcks et al. | 524/47 |
| 6,117,925 A | 9/2000 | Tomka | |
| 6,130,271 A | 10/2000 | Jarrett et al. | 523/113 |
| 6,136,097 A | 10/2000 | Lörcks et al. | |
| 6,146,750 A | 11/2000 | Kotani et al. | |
| 6,150,490 A | 11/2000 | Deckwer et al. | |
| 6,168,857 B1 * | 1/2001 | Andersen et al. | 428/292.1 |
| 6,201,034 B1 | 3/2001 | Warzelhan et al. | 521/138 |
| 6,214,907 B1 | 4/2001 | Tomka | 524/47 |
| 6,218,321 B1 | 4/2001 | Lorcks et al. | 442/165 |
| 6,231,970 B1 | 5/2001 | Andersen et al. | 428/332 |
| 6,235,815 B1 | 5/2001 | Loercks et al. | 524/47 |
| 6,235,816 B1 | 5/2001 | Lorcks et al. | 524/47 |
| 6,235,825 B1 | 5/2001 | Yoshida et al. | |
| 6,242,102 B1 | 6/2001 | Tomka et al. | 428/451 |
| 6,261,674 B1 * | 7/2001 | Branham et al. | 428/218 |
| 6,265,067 B1 | 7/2001 | Nucci et al. | |
| 6,326,440 B1 | 12/2001 | Terada et al. | |
| 6,350,530 B1 | 2/2002 | Morikawa et al. | |
| 6,472,497 B2 | 10/2002 | Loercks et al. | 528/196 |
| 6,479,164 B1 | 11/2002 | Lörcks et al. | 428/532 |
| 6,838,403 B2 * | 1/2005 | Tsai et al. | 442/394 |
| 2002/0098341 A1 * | 7/2002 | Schiffer et al. | 428/323 |

FOREIGN PATENT DOCUMENTS

| | | | |
|---|---|---|---|
| EP | 0 525 245 A1 | | 2/1993 |
| EP | 0 539 541 B1 | | 5/1993 |
| EP | 0 980 894 | | 2/2000 |
| EP | 1 008 629 | | 6/2000 |
| EP | 1 090 747 | | 4/2001 |
| JP | 8 193 165 | | 7/1996 |
| JP | 9 235 456 | | 9/1997 |
| JP | 11 500 468 | | 1/1999 |
| JP | 11 116 788 | | 4/1999 |
| JP | 11 241 008 | | 9/1999 |
| JP | 00 143 781 | | 5/2000 |
| JP | 02 532 603 | | 10/2002 |
| WO | WO 90/05161 | | 5/1990 |
| WO | WO 92/09654 | | 6/1992 |
| WO | WO 96/15173 | | 5/1996 |
| WO | WO 96/15174 | | 5/1996 |
| WO | WO 00/36014 | | 6/2000 |
| WO | WO 02/14430 | | 2/2002 |
| WO | WO 02/42365 | * | 5/2002 |

OTHER PUBLICATIONS

U.S. Appl. No. 09/820,916, filed Mar. 30, 2001, Holy.

* cited by examiner

BIODEGRADABLE FILMS AND SHEETS SUITABLE FOR USE AS COATINGS, WRAPS AND PACKAGING MATERIALS

BACKGROUND OF THE INVENTION

1. The Field of the Invention

The present invention relates generally to biodegradable polymer blends and articles manufactured therefrom. More particularly, the present invention relates to blends of two or more biopolymers and/or blends of biopolymers and fillers that yield sheets and films having improved physical properties, such as flexibility, elongation and/or dead-fold. The biodegradable polymer blends may be suitable for a number of applications, such as in the manufacture of disposable wraps, bags and other packaging materials or as coating materials.

2. The Relevant Technology

As affluence grows, so does the ability to purchase and accumulate more things. Never before in the history of the world has their been such a large number of people with such tremendous buying power. The ability to purchase relatively inexpensive goods, such as books, tools, toys and food, is a luxury enjoyed by virtually all levels of society, even those considered to be at the poorer end of the spectrum. Because a large percentage of what is purchased must be prepackaged, there has been a tremendous increase in the amount of disposable packaging materials that are routinely discarded into the environment as solid waste. Thus, as society becomes more affluent, it generates more trash.

Some packaging materials are only intended for a single use, such as boxes, cartons, pouches, bags and wraps used to package items purchased from wholesale and retail outlets. Even the advent of computers and "paperless" transactions has not stemmed the rising tide of packaging wastes. Indeed, the onset of "e-commerce" has spawned a great mail-order fad, thus creating a whole new market of individually packaged and shipped items.

Moreover, the modern, fast-paced lifestyle has greatly disrupted traditional eating routines in which people prepared their own meals and sat down as a family or group. Instead, people grab food on the run, thus creating ever-increasing amounts of fast food packaging materials that are used once and then discarded. In view of the high volume of disposable packaging materials being generated, some countries, particularly those in Europe, have begun to mandate either the recycling of fast food generated wastes or the use of packaging materials which are "biodegradable" or "compostable". Environmental activists commonly pressure companies that generate solid waste. As a result, large fast food chains such as McDonald's have been essentially forced to discontinue the use of certain nonbiodegradable packaging materials such as foamed polystyrene, either by government fiat or by pressure by environmental groups. McDonald's currently uses a combination of paper wraps and cardboard boxes as an interim solution until more environmentally friendly packaging materials can be made on a commercial basis. There is therefore an ever-present need to develop biodegradable alternatives to nonbiodegradable paper, plastics and metals.

In response to the demand for more environmentally friendly packaging materials, a number of new biopolymers have been developed that have been shown to biodegrade when discarded into the environment. Some of the larger players in the biodegradable plastics market include such well-known chemical companies as DuPont, BASF, Cargill-Dow Polymers, Union Carbide, Bayer, Monsanto, Mitsui and Eastman Chemical. Each of these companies has developed one or more classes or types of biopolymers. For example, both BASF and Eastman Chemical have developed biopolymers known as "aliphatic-aromatic" copolymers, sold under the trade names ECOFLEX and EASTAR BIO, respectively. Bayer has developed polyesteramides under the trade name BAK. Du Pont has developed BIOMAX, a modified polyethylene terephthalate (PET). Cargill-Dow has sold a variety of biopolymers based on polylactic acid (PLA). Monsanto developed a class of polymers known as polyhydroxyalkanoates (PHA), which include polyhydroxybutyrates (PHB), polyhydroxyvalerates (PHV), and polyhydroxybutyrate-hydroxyvalerate copolymers (PHBV). Union Carbide manufactures polycaprolactone (PCL) under the trade name TONE.

Each of the foregoing biopolymers has unique properties, benefits and weaknesses. For example, biopolymers such as BIOMAX, BAK, PHB and PLA tend to be strong but are also quite rigid or even brittle. This makes them poor candidates when flexible sheets or films are desired, such as for use in making wraps, bags and other packaging materials requiring good bend and folding capability. In the case of BIOMAX, DuPont does not presently provide specifications or conditions suitable for blowing films therefrom, thus indicating that it may not be presently believed that films can be blown from BIOMAX and similar polymers.

On the other hand, biopolymers such as PHBV, ECOFLEX and EASTAR BIO are many times more flexible compared to the more rigid biopolymers discussed immediately above. However, they have relatively low melting points such that they tend to be self adhering and unstable when newly processed and/or exposed to heat. While initially easily blown into films, such films are often difficult to process on a mass scale since they will tend to self adhere when rolled onto spools, which is typically required for sale and transport to other locations and companies. To prevent self-adhesion (or "blocking") of such films, it is typically necessary to incorporate a small amount (e.g. 0.15% by weight) of silica, talc or other fillers.

Another important criteria for sheets and films used in packaging is temperature stability. "Temperature stability" is the ability to maintain desired properties even when exposed to elevated or depressed temperatures, or a large range of temperatures, which may be encountered during shipping or storage. For example, many of the more flexible biopolymers tend to become soft and sticky if heated significantly above room temperature, thus compromising their ability to maintain their desired packaging properties. Other polymers can become rigid and brittle upon being cooled significantly below freezing (i.e., 0° C.). Thus, certain homopolymers or copolymers may not by themselves have sufficient stability within large temperature ranges.

In the case of the packaging of foods, such as refrigerated meats or fast foods, the packaging materials may be subjected to widely fluctuating temperatures, often being exposed to rapid changes in temperature. A biopolymer that may be perfectly suitable at room temperature, for example, may become completely unsuitable when used to wrap hot foods, particularly foods that emit significant quantities of hot water vapor or steam. In the case of meats, a wrapping that may be suitable when used at room temperature or below, such as at refrigeration or freezing temperatures, might become soft and sticky during microwave thawing of the meat. Of course, it would generally be unacceptable for a biopolymer to melt or adhere to the meat or fast food being served unless it was desired for some reason that the person actually consume the biopolymer.

Another factor that impacts whether a particular material is suitable for use as a wrap (e.g. sandwich or meat wrap) is whether sheets or films formed therefrom have suitable "dead-fold" properties. The term "dead-fold" is a measurement of the tendency of a sheet or film to remain in a desired orientation once used to encapsulate, enclose, wrap or otherwise enclose at least a portion of an item to be packaged. Wraps made from paper, for example, typically have modest to excellent dead fold properties depending on how the paper has been processed or treated. On the other hand, many plastic films or sheets (e.g. polyethylene) have very poor dead-fold properties such that they make very poor wraps. Instead, they are better suited for other uses, such as sacks, bags, pouches, coverings, etc. where good dead-fold is not necessary or desirable. In order to compensate for generally poor dead-fold properties, plastic wraps are typically manufactured to have high self-cling (e.g. SARAN WRAP). Self cling is a property having little to do with dead-fold, and is akin to the use of adhesives. One problem with self cling wraps is that they can be very difficult to handle. A self-cling wrap that is accidentally allowed to cling to itself before being used to wrap the substrate becomes useless and must be discarded and replaced with another length of self-cling wrap.

Paper also breathes (i.e. transmits gas) and has good water vapor transmission unless completely sealed with a wax or plastic. Plastic films and sheets, on the other hand, generally have very poor water vapor transmission and breathability. As a result, paper is a much better as a wrap for hot foods than plastic sheets because it permits the escape of water vapor. A plastic sheet, on the other hand, will retain virtually all of the water vapor, which condenses over time on the plastic surface and can make the food soggy, particularly a bun or slice of bread.

In view of the foregoing, it would be an advancement in the art to provide biodegradable polymers which could be readily formed into sheets and films that had strength and flexibility properties suitable for use as packaging materials and that had suitable temperature stability for a given use. In addition or alternatively, it would also be an advancement in the packaging art to provide improved biodegradable polymers that could be formed into sheets and films having sufficient dead-fold so that they could be folded, wrapped or otherwise manipulated in order to reliably enclose a substrate therein. In addition or alternatively, it would be a further advancement in the packaging art to provide improved biodegradable sheets and films that had enhanced breathability and water vapor transmission compared to conventional plastic sheets.

Such improved biopolymers, as well as sheets and films formed therefrom, are disclosed and claimed herein.

SUMMARY OF THE INVENTION

The invention encompasses biodegradable polymer blends having improved properties, including one or more of increased strength, flexibility, elongation, temperature stability, processability, breathability and dead-fold. Such polymer blends may be extruded, blown, cast or otherwise formed into sheets and films for use in a wide variety of packaging materials, such as wraps, bags, pouches, and laminate coatings, or they may be molded into shaped articles. In many cases, existing mixing, extrusion, blowing, injection molding, and blow molding apparatus known in the thermoplastic art are perfectly suitable for use in forming useful articles of manufacture, including sheets and films, from the thermoplastic compositions described herein.

One aspect of the invention involves blending at least one biopolymer having relatively high stiffness with at least one biopolymer having relatively high flexibility. For example, blends containing a relatively stiff BIOMAX polymer, a modified PET sold by Du Pont, with a relatively soft or flexible ECOFLEX, an aliphatic-aromatic copolymer sold by BASF, and/or EASTAR BIO, an aliphatic-aromatic copolymer sold by Eastman Chemical, have been shown to have strength and elongation properties which are superior to either biopolymer taken alone. Thus, the present invention provides blends that possess or demonstrate surprising synergistic effects.

BIOMAX is characterized as having a relatively high glass transition temperature and is highly crystalline at room temperature. BIOMAX tends to be quite stiff or brittle when formed into films or sheets. It also has poor elongation or elasticity. ECOFLEX, on the other hand, is characterized as having a relatively low glass transition temperature and is relatively amorphous or noncrystalline at room temperature, all of which contribute to the high softness, elasticity and high elongation of ECOFLEX. Even so, the inventors have discovered the surprising and unexpected result that various blends of BIOMAX and ECOFLEX actually exhibit higher elongation than ECOFLEX by itself, as well as higher break stress compared to either BIOMAX or ECOFLEX by themselves.

Other polymer blends have been developed, including but not limited to, a blend of ECOFLEX, PLA and thermoplastic starch (TPS) and a blend of BAK and TPS. In each case, blending a biopolymer having a relatively low glass transition temperature with a biopolymer having a relatively high glass transition temperature has resulted in polymer blends that, in many cases, exhibit the desired characteristics of each polymer by itself, in some cases exhibiting even better properties, while diminishing or minimizing the negative properties of each biopolymer by itself.

In general, biopolymers that may be characterized as being relatively "stiff" or less flexible include polymers which have a glass transition temperature greater than about 10° C., while biopolymers that may be characterized as being relatively "soft" include polymers having a glass transition temperature less than about 0° C. "Stiff" biopolymers preferably have a glass transition temperature greater than about 15° C., more preferably greater than about 25° C., and most preferably greater than about 35° C. "Soft" biopolymers preferably have a glass transition temperature of less than about −4° C., more preferably less than about −10° C., more especially preferably less than about −20° C., and most preferably less than about −30° C.

In addition, "stiff" polymers are generally more crystalline, while "soft" polymers are generally less crystalline and more amorphous, particularly at room temperature.

The relatively stiff polymers, characterized as those polymers generally having a glass transition greater than about 10° C., will preferably have a concentration in a range from about 20% to about 99% by weight of the biodegradable polymer blend, more preferably in a range from about 55% to about 98% by weight, and most preferably in a range from about 70% to about 95% by weight of the polymer blend (i.e., the combined weight of the stiff and soft polymers).

The relatively soft polymers, characterized as those polymers generally having a glass transition less than about 0° C., will preferably have a concentration in a range from about 1% to about 80% by weight of the biodegradable polymer blend, more preferably in a range from about 2% to about 45% by weight, and most preferably in a range from about 5% to about 30% by weight of the polymer blend.

Biopolymers within the scope of the present invention include, but are not limited to, synthetic polyesters, semi-synthetic polyesters made by fermentation (e.g., PHB and PHBV), polyester amides, polycarbonates, and polyester urethanes. In another aspect, it is within the scope of the invention to optionally include a variety of natural polymers and their derivatives, such as polymers comprising or derived from starch, cellulose, other polysaccharides and proteins.

Although it is within the scope of the invention to include thermoplastic polymers based on starch that include a high boiling liquid plasticizer such as glycerine, propylene glycol and the like, it is preferable, when manufacturing wraps that are intended to come into contact with food products, to utilize thermoplastic starch polymers that are made without the use of such plasticizers, which can potentially diffuse into food. Preferred thermoplastic starch polymers for use in making food wraps may advantageously utilize the natural water content of native starch granules to initially break down the granular structure and melt the native starch. Thereafter, the melted starch can be blended with one or more synthetic biopolymers, and the mixture dried by venting, in order to yield a final polymer blend. Where it is desired to make food wraps or other sheets or films intended to contact food using a thermoplastic starch polymer made with a high boiling liquid plasticizer, it will be preferable to limit the quantity of such thermoplastic starch polymers to less than 10% by weight of the polymer mixture, exclusive of any solid fillers.

In another aspect, it is within the scope of the invention to include one or more nonbiodegradable polymers within the polymer blends. Such polymers may remain in particulate form, or they may become thermoplastic during processing. In either case, the resulting polymer blends will tend to exhibit biodegradability so long as the nonbiodegradable polymers are included as a disperse, rather than a continuous, phase.

In another aspect, it is within the scope of the invention to incorporate inorganic and organic fillers in order to decrease self-adhesion, lower the cost, and increase the modulus of elasticity (Young's modulus) of the polymer blends. Examples of inorganic fillers include calcium carbonate, titanium dioxide, silica, talc, mica, and the like. Examples of organic fillers include wood flour, seeds, polymeric particles, ungelatinized starch granules, and the like. In addition, plasticizers may be used in order to impart desired softening and elongation properties.

In the case of sheets or films intended to be used as "wraps", such as wraps used to enclose meats, other perishable food items, and especially fast food items (e.g., sandwiches, burgers and dessert items), it may be desirable to provide sheets and films having good "dead-fold" properties so that once folded, wrapped or otherwise manipulated into a desired orientation, such wraps will tend to substantially maintain their orientation so as to not spontaneously unfold or unwrap, as occurs with a large number of plastic sheets and films (e.g., polyethylene). Dead-fold is a measure of the ability of a sheet or film to retain a crease, crinkle or other bend. It is measured independently of self cling, heat sealing, or the use of an adhesive to maintain a desired orientation.

In order to improve the dead-fold properties of sheets or films produced therefrom, biopolymer blends (optionally including fillers) may be engineered so as to yield films having a relatively high Young's modulus, preferably greater than about 100 MPa, more preferably greater than about 150 MPa, and most preferably greater than about 200 MPa. In general, increasing the concentration of the stiff biopolymer will tend to increase the Young's modulus and the resulting dead-fold properties. It should be understood, however, that Young's modulus only loosely correlates to dead-fold and does not, in every case, serve to define or predict the dead-fold properties of a particular sheet or film.

Including an inorganic filler is another way to increase dead-fold. Thus, it has been found that adding significant quantities of an inorganic filler, such as greater than about 10% by weight of the overall mixture, preferably greater than about 15% by weight, more preferably greater than about 20% by weight, more especially preferably greater than about 30% by weight, and most preferably greater than about 35% by weight of the overall mixture, greatly improves the dead-fold properties of sheets and films manufactured from polymers or polymer blends according to the invention.

Yet another way to increase the dead-fold properties is to increase the surface area, or "bulk hand feel" of a sheet, which is done by disrupting the generally smooth, planar nature of the sheet or film. This may be accomplished, for example, by embossing, crimping, quilting or otherwise texturing the sheet so as to have regularly spaced-apart or random hills and valleys rather than simply being a perfectly smooth, planar sheet. A sheet or film may be textured, for example, by passing the sheet or film through a pair of knurled or other embossing-type rollers. Such texturing increases the ability of a sheet to take and maintain a fold, thus improving the dead-fold properties of the sheet. Another way to increase the surface area of sheets and films according to the invention is to incorporate one or more particulate fillers that, at least a portion of which, have a particle size diameter equal to or greater than the thickness of the film or sheet.

When used to wrap foods, or whenever good dead-fold properties are desired, sheets and films according to the invention can be manufactured so as to have a dead-fold of at least about 50% (i.e., when creased using a standard dead-fold test, the sheets and films will maintain at least about 50% of their original crease). Preferably, such sheets and films will have a dead-fold greater than about 60%, more preferably greater than about 70%, and most preferably greater than about 80%. As will be shown hereafter, sheets and films according to the invention have been developed that have a dead-fold approaching or equal to 100% (i.e., when folded they remain folded absent the application of an external force sufficient to reverse the fold). By way of comparison, sheets and films made from polyethylene (e.g., for use in making sandwich or garbage bags) typically have a dead-fold of 0%. Standard paper wraps commonly used in the fast food industry typically have a dead-fold between about 40-80%. Thus, sheets and films according to the invention have dead-fold properties that meet or exceed those of standard paper wraps, and which are many times greater than conventional plastic films and sheets, often orders of magnitude greater.

In some cases, it may be desirable for sheets and films according to the invention to have the feel and breathability of paper. As set forth above, particulate fillers, both organic and inorganic, can be used to increase the modulus of elasticity and dead-fold. Such fillers also advantageously create "cavitation" whenever the sheets or films are stretched during processing. Cavitation occurs as the thermoplastic polymer fraction is pulled in either a monoaxial or biaxial direction and the filler particles create a discontinuity in the film or sheet that increases in size during stretching.

In essence, a portion of the stretched polymer pulls away from the filler particles, resulting in tiny cavities in the vicinity of the filler particles. This, in turn, results in greatly increased breathability and vapor transmission of the sheets and films. It also results in films or sheets having a touch and feel that much more closely resembles the touch and feel of paper, as contrasted with conventional thermoplastic sheets and films. The result is a sheet or wrap that can be used for applications that are presently performed or satisfied using paper products (i.e., wraps, tissues, printed materials, etc.)

Articles of manufacture made according to the invention can have any desired thickness. Thicknesses of sheets and films may range from 0.0001" to 0.1" (about 2.5 microns to about 2.5 mm). Sheets and films suitable for wrapping, enclosing or otherwise covering food items or other solid substrates will typically have a measured thickness between about 0.0003 " and about 0.01" (about 7.5-250 microns), and a calculated thickness between about 0.00015" and about 0.005" (about 4-125 microns). The measured thickness will typically be between 10-100% larger than the calculated thickness when the sheets and films are made from compositions that have a relatively high concentration of particulate filler particles, which can protrude from the surface of the sheet or film. This phenomenon is especially pronounced when significant quantities of filler particles having a particle size diameter that is larger than the thickness of the polymer matrix are used.

Another advantage of utilizing biopolymers in the manufacture of wraps is that biopolymers are generally able to accept and retain print much more easily than conventional plastics or waxed papers. Many plastics and waxes are highly hydrophobic and must be surface oxidized in order to provide a chemically receptive surface to which ink can adhere. Biopolymers, on the other hand, typically include an abundant fraction of oxygen-containing moieties, such as ester, amide and/or urethane groups, to which inks can readily adhere.

The sheets and films according to the invention may comprise a single layer or multiple layers as desired. They may be formed by mono- and co-extrusion, casting and film blowing techniques known in the art. Because they are thermoplastic, the sheets can be post-treated by heat sealing to join two ends together to form sacks, pockets, pouches, and the like. They can be laminated onto existing sheets or substrates. They can also be coated themselves.

These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings, in which.

DETAILED DESCRIPTION OF THE PREFERRED EMBODIMENTS

I. Introduction

Figure 1:
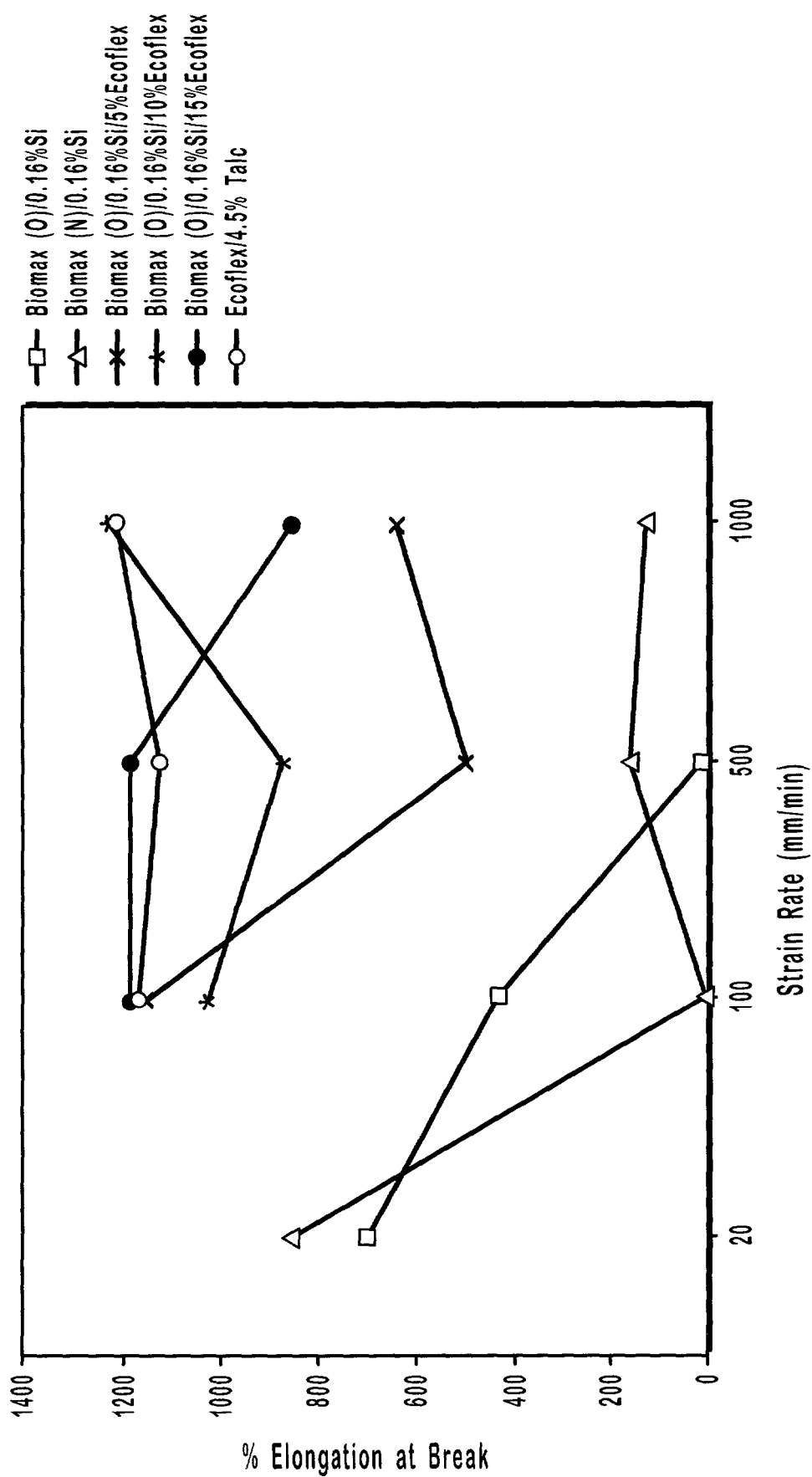
FIG. 1 is a plot of the percent elongation at break versus the applied strain rate for various neat and blended polymer films.

The invention relates to biodegradable polymer blends having greatly improved properties compared to unblended and/or unfilled biodegradable homopolymers and copolymers. Such properties include one or more of improved strength, flexibility, elongation, temperature stability, processability, and dead-fold. Moreover, sheet, films and other articles made from such blends are in many ways superior to conventional plastics, which suffer from their inability to degrade when discarded in the environment, which are not readily printable absent special treatment, and which generally have poor dead-fold properties.

In one aspect of the invention, polymer blends according to the invention may include at least one biopolymer having relatively high stiffness and at least one biopolymer having relatively high flexibility. When blended together, it is possible to derive the beneficial properties from each polymer while offsetting or eliminating the negative properties of each polymer when used separately to make films, sheets and other articles.

The inventive polymer blends may be extruded, blown or otherwise formed into sheets and films for use in a wide variety of packaging materials, such as wraps, bags, pouches, coverings, and laminate coatings. By blending a relatively stiff polymer with a relatively flexible polymer, the inventors have discovered that, in some cases, the beneficial properties of the blend actually exceed the desirable properties of each polymer when used individually.

Thus, the surprising result of an unexpected synergistic effect has been demonstrated.

Biopolymers that may be used within blends within the scope of the present invention include, but are not limited to, synthetic polyesters, naturally derived polyesters, polyester amides, polycarbonates, and polyester urethanes, but may also include a variety of natural polymers and their derivatives, such as polymers and derivatives of starch, cellulose, other polysaccharides, and proteins. Particulate fillers, both organic and inorganic, may be incorporated to improve the dead-fold properties, increase bulk hand feel, reduce cost, and decrease self-adhesion. Plasticizers may be added to impart desired softening and elongation properties. Sheets and films may be embossed, crimped, quilted or otherwise textured to improve bulk hand feel and dead-fold. The biopolymers and biopolymer blends according to the invention more readily accept and retain print compared to conventional plastics or waxed papers because they typically include oxygen-containing moieties, such as ester, amide, or urethane groups, to which inks can readily adhere.

The terms "sheets" and "films" are to be understood as having their customary meanings as used in the thermoplastic and packaging arts. Nevertheless, because the distinction between what constitutes a "sheet" and what constitutes a "film" largely turns on the thickness of the article of manufacture, the distinction is somewhat arbitrary (i.e. some articles may constitute both sheets and films). Because the biodegradable compositions according to the invention can be used to manufacture a wide variety of articles of manufacture, including articles useful to wrap, package or otherwise package food or other solid substrates, including sheets and films having a wide variety of thicknesses (both measured and calculated), it is not the intention of this disclosure to precisely distinguish, in all cases, between what may arguably constitute a "sheet" versus articles that may arguably constitute a "film". Therefore, when the present disclosure refers to "sheets and films" and "sheets or films", the intention is to designate the entire universe of articles of manufacture that may arguably constitute "sheets", "films" or both.

The term "polymer blend" includes two or more unfilled polymers and/or one or more polymers into which one or more types of solid fillers have been added.

II. Biodegradable Polymers

Biopolymers within the scope of the present invention include polymers which degrade through the action of living organisms, light, air, water and combinations of the foregoing. Such polymers include a range of synthetic polymers, such as polyesters, polyester amides, polycarbonates and the like. Naturally-derived semi-synthetic polyesters (e.g. from fermentation) can also be used. Biodegradation reactions are typically enzyme-catalyzed and generally occur in the presence of moisture. Natural macromolecules containing hydrolyzable linkages, such as protein, cellulose and starch, are generally susceptible to biodegradation by the hydrolytic enzymes of microorganisms. A few man-made polymers, however, are also biodegradable. The hydrophilic/hydrophobic character of polymers greatly affects their biodegradability, with more polar polymers being more readily biodegradable as a general rule. Other important polymer characteristics that affect biodegradability include crystallinity, chain flexibility and chain length.

Besides being able to biodegrade, it is often important for a polymer or polymer blend to exhibit certain physical properties, such as stiffness, flexibility, water-resistance, strength, elongation, temperature stability, moisture vapor transmission, gas permeability, and/or dead-fold. The intended application of a particular polymer blend will often dictate which properties are necessary in order for a particular polymer blend, or article manufactured therefrom, to exhibit the desired performance criteria. In the case of sheets and films suitable for use as packaging materials, desired performance criteria may include elongation, dead-fold, strength, printability, imperviousness to liquids, breathability, temperature stability, and the like.

Because of the limited number of biodegradable polymers, it is often difficult, or even impossible, to identify one single polymer or copolymer which meets all, or even most, of the desired performance criteria for a given application. This is particularly true in the area of packaging materials. Polymers that have a high glass transition temperature ($T_g$) are often difficult, if not impossible, to blow or cast into films on a mass scale. On the other hand, polymers that have a very low glass transition temperature typically have relatively low softening and/or melting points, which makes them difficult to mass produce into sheets and films without the tendency of blocking, or self adhesion. Moreover, such sheets and films may lack adequate strength, water vapor barrier properties, high temperature stability, and/or modulus to be suitable for certain applications, such as in the manufacture of wraps or laminates coatings.

For these and other reasons, biodegradable polymers have found little use in the area of food packaging materials, particularly in the field of wraps used to package and encapsulate food items during single serving use. In one aspect of the invention, the inventors have discovered that sheets and films suitable for making wraps and other packaging materials can be obtained by blending one or more "stiff", or high glass transition temperature, polymers with one or more "soft", or low glass transition temperature, polymers. In another aspect of the invention, polymers or polymer blends can be filled with particulate fillers, and/or sheets or films made therefrom can be textured, in order to yield sheets have adequate dead-fold properties.

A. Stiff Polymers.

Even though the use of terms such as "stiff" and "soft" polymers may be somewhat arbitrary, such classifications are useful when determining which polymers to blend together in order to obtain a polymer blend having the desired performance criteria, particularly when the goal is to manufacture a film or sheet suitable for use as a laminate coating, such as on molded articles made of starch or other moisture sensitive materials, or as a wrap or other packaging material.

In general, those polymers that may be characterized as being relatively "stiff", or less flexible, typically include polymers which have a glass transition temperature greater than about 10° C. Stiff polymers within the scope of the invention will preferably have a glass transition temperature greater than about 15° C., more preferably greater than about 25° C., and most preferably greater than about 35° C. The foregoing ranges attempt to take into consideration the fact that the "glass transition temperature" is not always a discreet temperature but is often a range of temperatures within which the polymer changes from being a glassy and more brittle material to being a softer and more flexible material.

The glass transition temperature should be distinguished from the melting point of a polymer, at or beyond which a thermoplastic polymer becomes plastic and deformable without significant rupture. Although there is often a positive correlation between a polymer's glass transition temperature ($T_g$) and its melting point ($T_m$), this is not strictly the case with all polymers. In some cases the difference between $T_g$ and $T_m$ may be large. In other cases it may be relatively small. It is generally the case, however, that the melting point of a stiffer polymer will typically be greater than the melting point of a softer polymer.

Preferred "stiff" polymers within the scope of the present invention include, but are not limited to, modified polyethylene terephthalates (such as those manufactured by Du Pont), polyesteramides (such as those manufactured by Bayer), polylactic acid-based polymers (such as those manufactured by Cargill-Dow Polymers and Dianippon Ink), terpolymers based on polylactic acid, polyglycolic acid and polycaprolactone (such as those manufactured by Mitsui Chemicals), polyalkylene carbonates (such as polyethylene carbonate manufactured by PAC Polymers), and polyhydroxybutyrate (PHB).

A presently preferred stiff biopolymer within the scope of the invention includes a range of modified polyethylene terephthalate (PET) polymers manufactured by DuPont, and sold under the trade name BIOMAX. Various modified PET polymers of DuPont are described in greater detail in U.S. Pat. No. 5,053,482 to Tietz, U.S. Pat. No. 5,097,004 to Gallagher et al., U.S. Pat. No. 5,097,005 to Tietz, U.S. Pat. No. 5,171,308 to Gallagher et al., U.S. Pat. No. 5,219,646, to Gallagher et al., and U.S. Pat. No. 5,295,985 to Romesser et al. For purposes of disclosing "stiff" polymers, the foregoing patents are disclosed herein by reference.

In general, the modified PET polymers of DuPont may be characterized as comprising alternating units of terephthalate and an aliphatic constituent, with the aliphatic constituent comprising a statistical distribution of two or more different aliphatic units derived from two or more different diols, such as ethylene glycol, diethylene glycol, triethylene oxide, polyethylene glycol, lower alkane diols, both branched and unbranched, and derivatives of the foregoing. A portion of the aliphatic units may also be derived from an aliphatic diacid, such as adipic acid. In addition, a fraction of the phenylene groups within the repeating terephthalate units may be sulfonated and neutralized with an alkali metal or alkaline earth metal base. Both the aliphatic portion of the modified PET polymer as well as the statistically significant quantity of sulfonated terephthalate units contribute significantly to the biodegradability of the BIOMAX polymer.

Some BIOMAX grades of polymers have a melting point of 200-208° C. and a glass transition temperature of 40-60° C. BIOMAX 6926 is one such grade. It is a relatively strong and stiff polymer that, when blended with a softer polymer, yields excellent sheets and films suitable for wrapping and other packaging materials. Films and sheets of BIOMAX or BIOMAX blends can be cast or blown and then optionally textured in order to impart desired properties described more fully herein. In addition, or in the alternative, one or more particulate fillers may be included in order to impart desired properties described more fully herein.

In general, modified polyethylene terephthalates that would be expected to have properties suitable for use as a "stiff" biodegradable polymer consist essentially of recurring structural units having the following general formula:

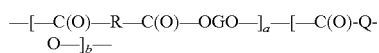

wherein up to about 40 mole % of R is selected from the group consisting of a chemical bond and one or more divalent, non-aromatic, $C_1$-$C_{10}$ hydrocarbylene radicals, and the remainder of R is at least about 85% mole % p-phenylene radical, wherein G includes from 0 to about 30 mole % of a polyethylene ether radical selected from the group consisting of:

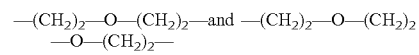

and the remainder of G is selected from the group consisting of polyalkylene ether radicals of molecular weight at least about 250 (number average), and —$(CH_2)_2$—, —$(CH_2)_3$—, and —$(CH_2)_4$— radicals, wherein Q is derived from a hydroxy acid of the formula:

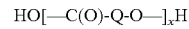

wherein x is an integer and such hydroxy acids have a melting point at least 5° C. below their decomposition temperature, and Q is selected from the group consisting of a chemical bond and hydrocarbylene radicals —$(CH_2)_n$—, where n is an integer from 1 to 5, —C(R')H—, and —C(R')HCH$_2$—. wherein R' is selected from the group consisting of —$CH_3$ and —$CH_2CH_3$, and wherein "a" and "b" are mole fractions of the polymer, and the mole fraction "a" may be 0.6 to 1 and, correspondingly, mole fraction "b" may be 0 to 0.4, and wherein about 0.1 to about 15 mole %, preferably about 0.1 to about 2.5 mole %, of the polymer contains alkali metal or alkaline earth metal sulfo groups, especially about 1.5 to about 2 mole % of such groups.

Another stiff biopolymer that may be used in manufacturing polymer blends according to the present invention includes polylactic acid (PLA). Polylactic acid typically has a glass transition temperature of about 59° C. and a melting point of about 178° C. PLA has low elongation and is quite hard. It is a strong thermoplastic material that can be injection molded, extruded, cast, thermoformed, or used as spun or melt-blown fibers to produce nonwoven goods.

Polymers based on or including PLA first found commercial application as medical sutures in 1970. High polymers of lactic acid ($M_n$=50,000-110,000) are strong thermoplastics that can be fabricated into useful products that can be broken down by common soil bacteria. Potential applications of PLA include paper coatings for packaging (food and beverage cartons), plastic foam for fast foods, microwavable containers, and other consumer products such as disposable diapers or yard waste bags. PLA can be a homopolymer or it may be copolymerized with glycolides, lactones or other monomers. One particularly attractive feature of PLA-based polymers is that they are derived from renewable agricultural products.

Because lactic acid is difficult to polymerize directly to high polymers in a single step on a commercial scale, most companies employ a two-step process. Lactic acid is first oligomerized to a linear chain with a molecular weight of less than 3000 by removing water. The oligomer is then depolymerized to lactide, which is a cyclic dimer consisting of two condensed lactic acid molecules. This six-member ring is purified and subjected to ring opening polymerization to produce polylactic acid with a molecular weight of 50,000-110,000.

Because lactic acid has an asymmetric carbon atom, it exists in several isomeric forms. The lactic acid most commonly sold commercially contains equal parts of L-(+)-lactic acid and D-(−)-lactic acid and is therefore optically inactive, with no rotatory power. The racemic mixture is called DL-lactic acid.

Another stiff polymer that may be used within the inventive polymer blends is known as CPLA, which is a derivative of PLA and is sold by Dianippon Ink. Two classes of CPLA are sold and are referred to as "CPLA hard" and "CPLA soft", both of which comprise "stiff polymers", as that term has been defined herein. CPLA hard has a glass transition temperature of 60° C., while CPLA soft has a glass transition temperature of 51° C.

Bayer corporation manufactures polyesteramides sold under the name BAK. Polyester amides manufactured by Bayer are described more fully in U.S. Pat. No. 5,644,020 to Timmermann et al. For purposes of disclosing biodegradable polymers, at least some of which constitute "stiff" polymers, the foregoing patent is incorporated herein by reference. One form of BAK is prepared from adipic acid, 1,4-butanediol, and 6-aminocaproic acid. BAK 1095, a polyesteramide having an $M_n$ of 22,700 and an $M_w$ of 69,700 and which contains aromatic constituents, has a melting point of 125° C. BAK 2195 has a melting point of 175° C. Although the glass transition temperatures of BAK 1095 and BAK 2195 are difficult to measure, because BAK appears to behave like a stiff polymer in the sense that improved properties may be obtained by blending BAK with a soft polymer, the inventors believe that the glass transition temperature of BAK polymers is essentially at least about 10° C. For purposes of understanding the meaning and scope of the specification and claims, polyester amides such as BAK, as well as others that behave like BAK and can be used as a "stiff" polymer, shall be deemed to have a glass temperature of at least about 10° C.

Mitsui Chemicals, Inc. manufactures a terpolymer that includes units derived from polylactide, polyglycolide and polycaprolactone that have been condensed together. Thus, this polymer is an aliphatic polymer and may be characterized as a PLA/PGA/PCL terpolymer. Three grade of this polymer are available, H100J, S100 and T100. The H100J grade PLA/PGA/PCL terpolymer has been analyzed to have a glass transition temperatures of 74° C. and a melting point of 173° C.

PAC Polymers Inc. manufactures polyethylene carbonate (PEC) having a glass transition temperature range of 10-28° C. PEC is a "stiff" polymer for purposes of the present invention.

Polyhydroxybutyrates (PHBs) can act as either a stiff or soft polymer depending on their molecular weight, whether they have been modified using chain extenders and/or branching agents, whether they have been copolymerized with another polymer, and depending on the other constituents within the overall thermoplastic composition. In this sense, PHBs are unique among biopolymers and may be of special interest for use in making wraps, laminate coatings, packaging materials, and the like.

As discussed more fully below, native or dried gelatinized starch can be used as particulate fillers in order to increase the dead-fold properties of sheets and films made from a particular polymer or polymer blend. However, to the extent that starches become thermoplastic but retain a substantial portion of their crystallinity, such starches may act as "stiff", rather than "soft", polymers.

B. Soft Polymers.

In general, those biopolymers that may be characterized as being "soft", or less rigid, typically include polymers which have a glass transition temperature of less than about 0° C. Soft biopolymers within the scope of the invention will preferably have a glass transition temperature of less than about −4° C., more preferably less than about −10° C., more especially preferably less than about −20° C., and most preferably less than about −30° C. The foregoing ranges attempt to take into consideration the fact that the "glass transition temperatures" of "soft" polymers are not always discreet temperatures but often comprise a range of temperatures.

Preferred "soft" biopolymers within the scope of the present invention include, but are not limited to, aliphatic-aromatic copolyesters (such as those manufactured by BASF and Eastman Chemical), aliphatic polyesters which include repeating units having at least 5 carbon atoms, e.g., polyhydroxyvalerate, polyhydroxybutyrate-hydroxyvalerate copolymer and polycaprolactone (such as those manufactured by Daicel Chemical, Monsanto, Solvay, and Union Carbide), and succinate-based aliphatic polymers, e.g., polybutylene succinate (PBS), polybutylene succinate adipate (PBSA), and polyethylene succinate (PES) (such as those manufactured by Showa High Polymer).

U.S. Pat. No. 5,817,721 to Warzelhan et al., and assigned to BASF, discloses a range of aliphatic-aromatic copolyesters within the scope of the invention. Similarly, U.S. Pat. Nos. 5,292,783, 5,446,079, 5,559,171, 5,580,911, 5,599,858 and 5,900,322, all to Buchanan et al. and assigned to Eastman Chemical, as well as U.S. Pat. Nos. 6,020,393 and 6,922,829 to Khemani, also assigned to Eastman Chemical, all disclose aliphatic-aromatic copolyesters within the scope of the invention. For purposes of disclosing "soft" polymers, the foregoing patents are incorporated herein by reference.

A preferred "soft" polymer that may be used in the manufacture of the inventive polymer blends includes aliphatic-aromatic copolyesters manufactured by BASF and sold under the trade name ECOFLEX. The aliphatic-aromatic copolyesters manufactured by BASF comprise a statistical copolyester derived from 1,4-butanediol, adipic acid, and dimethylterephthalate (DMT). In some cases, a diisocyanate is used as a chain lengthener. Branching agents may also be used to yield branched, rather than linear, copolymers.

Copolymerization of aliphatic monomers, such as diols and diacids, with aromatic monomers, such as diols and diacids (e.g., terephthalic acid or diester derivatives such as DMT), is one way to improve the performance properties of aliphatic polyesters. However, questions have been raised within the industry regarding the complete biodegradability of aliphatic-aromatic copolyesters because aromatic copolyesters such as PET are known to be resistant to microbial attack. Nevertheless, researchers have discovered that aliphatic-aromatic copolyesters are indeed biodegradable and that the biodegradability of these copolyesters is related to the length of the aromatic sequence. Block copolyesters with relatively long aromatic sequences are less rapidly degraded by microorganisms compared to random copolyesters having more interrupted aromatic sequences. Film thickness is also a factor, with thicker films degrading more slowly due to their reduced surface to volume ratio than thinner films, all things being equal. The polymer presently sold under the name ECOFLEX S BX 7000 by BASF has a glass transition temperature of −33° C. and a melting range of 105-115° C.

Another "soft" aliphatic-aromatic copolyester is manufactured by Eastman Chemical Company and is sold under the trade name EASTAR BIO. The aliphatic-aromatic copolyester manufactured by Eastman is a random copolymer derived from 1,4-butanediol, adipic acid, and dimethylterephthalate (DMT). One particular grade of EASTAR BIO, known as EASTAR BIO 14766, has a glass transition temperature of −33° C. and a melting point of 112° C. It has a tensile strength at break in the machine direction of 19

MPa, an elongation at break of 600%, and a tensile modulus of elasticity of 97 MPa (tangent). It has an Elmendorf tear strength of 282 g.

Polycaprolactone (PCL) is a biodegradable aliphatic polyester having a relatively low melting point and a very low glass transition temperature. It is so named because it is formed by polymerizing ∈-caprolactone. The glass transition temperature of PCL is −60° C. and the melting point is only 60° C. Because of this, PCL and other similar aliphatic polyesters with low melting points are difficult to process by conventional techniques such as film blowing and blow molding. Films made from PCL are tacky as extruded and have low melt strength over 130° C. Also, the slow crystallization of this polymer causes the properties to change over time. Blending PCL with other polymers improves the processability of PCL. One common PCL is TONE, manufactured by Union Carbide. Other manufactures of PCL include Daicel Chemical, Ltd. and Solvay. Though the use of PCL is certainly within the scope of the invention, it is currently a less preferred soft biopolymer than aliphatic-aromatic polyesters, which give overall better performance for wraps and laminate coatings.

∈-Caprolactone is a seven member ring compound that is characterized by its reactivity. Cleavage usually takes place at the carbonyl group. ∈-Caprolactone is typically made from cyclohexanone by a peroxidation process. PCL is a polyester made by polymerizing ∈-caprolactone. Higher molecular weight PCL may be prepared under the influence of a wide variety of catalysts, such as aluminum alkyls, organometallic compositions, such as Group Ia, IIa, IIb, or IIIa metal alkyls, Grignard reagents, Group II metal dialkyls, calcium or other metal amides or alkyl amides, reaction products of alkaline earth hexamoniates, alkaline oxides and acetonitrile, aluminum trialkoxides, alkaline earth aluminum or boron hydrides, alkaline metal or alkaline earth hydrides or alkaline metals alone. PCL is typically prepared by initiation with an aliphatic diol (HO—R—OH), which forms a terminal end group.

Another "soft" aliphatic polyester that may be used in manufacturing the inventive polymer blends is polyhydroxybutyrate-hydroxyvalerate copolymer (PHBV), which is manufactured using a microbial-induced fermentation process. One such PHBV copolyester, manufactured by the Monsanto Company, has a glass transition temperature of about 0° C. and a melting point of about 170° C. If possible, PHBV copolyesters should be formulated and/or modified so as have a glass transition temperature less than about −5° C.

In the fermentation process used to manufacture PHBV, a single bacterium species converts corn and potato feed stocks into a copolymer of polyhydroxybutyrate and hydroxyvalerate constituents. By manipulating the feed stocks, the proportions of the two polymer segments can be varied to make different grades of material. All grades are moisture resistant while still being fully biodegradable. The world producers of PHBV are Monsanto, with its BIOPOL product, and METABOLIX, with its various grades of polyhydroxy-alkanoates (PHAs). Polyhydroxyvalerate (PHV) is also an example of a "soft" polymer.

As set forth above, polyhydroxybutyrates (PHBs) can act as either a stiff or soft polymer depending on their molecular weight, whether they have been modified using chain extenders and/or branching agents, whether they have been copolymerized with another polymer, and depending on the other constituents within the overall thermoplastic composition. In this sense, PHBs are unique among biopolymers and may be of special interest for use in making wraps, laminate coatings, packaging materials, and the like.

Another class of "soft" aliphatic polyesters are based on repeating succinate units such as polybutylene succinate (PBS), polybutylene succinate adipate (PBSA), and polyethylene succinate (PES). Each of these succinate-based aliphatic polyesters is manufactured by Showa High Polymer, Ltd. and sold under the trade name BIONELLE. PBS (Bionolle 1001) has a glass transition temperature of −30° C. and a melting point of 114° C. PBSA (Bionolle 3001) has a glass transition temperature of −35° C. and a melting point of 95° C. PES (Bionolle 6000) has a glass transition temperature of −4° C. and a melting point of 102° C.

The target applications for BIONOLLE include films, sheets, filaments, foam-molded products and foam-expanded products. BIONOLLE is biodegradable in compost, in moist soil, in water with activated sludge, and in sea water. PBSA degrades rapidly in a compost environment, so it is similar to cellulose, whereas PBS degrades less rapidly and is similar to newspaper in terms of biodegradation.

BIONOLLE is manufactured according to a patented two-step process of preparing succinate aliphatic polyesters with high molecular weights and useful physical properties. In a first step, a low molecular weight hydroxy-terminated aliphatic polyester prepolymer is made from a glycol and an aliphatic dicarboxylic acid. This polymerization is catalyzed by a titanium catalyst such as tetraisopropyltitanate, tetraisopropoxy titanium, dibutoxydiacetoacetoxy titanium, or tetrabutyltitanate. In the second step, a high molecular weight polyester is made by reacting a diisocyanate, such as hexamethylene diisocyante (HMDI) with a polyester prepolymer.

Showa manufactures PBS by first reacting 1,4-butanediol with succinic acid in a condensation reaction to form a prepolymer and then reacting the prepolymer with HMDI as a chain extender.

PBSA copolymer is manufactured by first condensing 1,4-butanediol, succinic acid and adipic acid to form a prepolymer and then reacting the prepolymer with HMDI as a chain extender.

PES homopolymer is prepared by reacting ethylene glycol and succinic acid and using HMDI or diphenylmethane diisocyanate as a chain extender.

Succinate-based aliphatic polyesters are also manufactured by Mitsui Toatsu, Nippon Shokubai, Cheil Synthetics, Eastman Chemical, and Sunkyon Industries.

Finally, although starch, such as modified starch or starch that has been gelatinized with water and subsequently dried, is known to have a high glass transition temperature (i.e., 70-85° C.) and be very crystalline at room temperature, certain forms of starch in which the crystallinity has been greatly reduced or destroyed altogether can have very low glass transition temperatures and may, in fact, constitute "soft" biodegradable polymers within the scope of the invention. As discussed more fully below, native or dried gelatinized starch can be used as particulate fillers in order to increase the dead-fold properties of sheets and films made from a particular polymer or polymer blend. Moreover, to the extent that starches become thermoplastic but retain a substantial portion of their crystallinity, such starches may act as "stiff", rather than "soft", polymers. Nevertheless, there exists a range of thermoplastic starch polymers that can behave as "soft" polymers.

For example, U.S. Pat. No. 5,362,777 to Tomka is a landmark patent and was the first attempt to manufacture what is known as thermoplastically processable starch (TPS). TPS is characterized as a thermoplastic starch polymer formed by mixing and heating native or modified starch in the presence of an appropriate high boiling plasticizer (such as glycerin and sorbitol) in a manner such that the starch has little or no crystallinity, a low glass transition temperature, and very low water (less than 5%, preferably less than about 1% by weight while in a melted state after venting and prior to conditioning). When blended with appropriate hydrophobic polymers, such as the stiff polymers disclosed herein, e.g., polyesteramides such as BAK, TPS can have a glass transition temperature as low as −60° C., and typically below about −20° C.

Although it is within the scope of the invention to include thermoplastic polymers based on starch that include plasticizers such as glycerine, sorbitol, propylene glycol and the like, it is preferable, when manufacturing wraps for use in covering food products, to utilize thermoplastic starch polymers that are made without the use of such plasticizers, which can potentially diffuse into food. Preferred thermoplastic starch polymers for use in making food wraps may advantageously utilize the natural water content of native starch granules to initially break down the granular structure and melt the native starch. Thereafter, the melted starch can be blended with one or more synthetic biopolymers, and the mixture dried by venting, in order to yield a final polymer blend. Where it is desired to make food wraps or other sheets or films intended to contact food using a thermoplastic starch polymer made with a high boiling liquid plasticizer, it will be preferable to limit the quantity of such thermoplastic starch polymers to less than 10% by weight of the polymer mixture, exclusive of any solid fillers.

III. Optional Components

There are a number of optional components which may be included within the biodegradable polymer blends of the present invention in order to impart desired properties. These include, but are not limited to, plasticizers, lubricants, fillers, natural polymers and nonbiodegradable polymers.

A. Plasticizers.

Plasticizers may optionally be added in order to improve processing, such as extrusion and/or film blowing, or final mechanical properties, particularly of polymer blends that are relatively stiff. A stiffer polymer blend may be dictated by other performance criteria, such as high temperature stability, strength, lower elongation, higher dead-fold, resistance to "blocking" during and after processing, and the like. In such cases, a plasticizer may be necessary in order to allow the polymer blend to satisfy certain processing and/or performance criteria.

Suitable plasticizers within the scope of the invention, particularly when incorporated into a polymer blend that is intended to be used in the manufacture of wraps and other packaging materials that will come into contact with food, will preferably be safe if consumed, at least in smaller quantities.

Optional plasticizers that may be used in accordance with the present invention include, but are not limited to, soybean oil, caster oil, TWEEN 20, TWEEN 40, TWEEN 60, TWEEN 80, TWEEN 85, sorbitan monolaurate, sorbitan monooleate, sorbitan monopalmitate, sorbitan trioleate, sorbitan monostearate, PEG, derivatives of PEG, N,N-ethylene bis-stearamide, N,N-ethylene bis-oleamide, polymeric plasticizers such as poly(1,6-hexamethylene adipate), and other compatible low molecular weight polymers.

Examples of lubricants include salts of fatty acids, an example of which is magnesium stearate.

B. Solid Fillers.

Fillers may optionally be added for a number of reasons, including but not limited to, increasing the Young's modulus, dead-fold properties, rigidity, and breathability, and for decreasing the cost and tendency of the polymer blend to "block" or self-adhere during processing. Certain fillers, like fibers having a high aspect ratio, may increase the strength, fracture energy and dead-fold properties of the sheets and films according to the invention. The fillers within the scope of the invention will generally fall within three classes or categories: (1) inorganic particulate fillers, (2) fibers and (3) organic fillers.

1. Inorganic Particulate Fillers

The terms "particle" or "particulate filler" should be interpreted broadly to include filler particles having any of a variety of different shapes and aspect ratios. In general, "particles" are those solids having an aspect ratio (i.e., the ratio of length to thickness) of less than about 10:1. Solids having an aspect ratio greater than about 10:1 may be better understood as "fibers", as that term will be defined and discussed hereinbelow.

Virtually any known filler, whether inert or reactive, can be incorporated into the biodegradable polymer blends. In general, adding an inorganic filler will tend to greatly reduce the cost of the resulting polymer blend. If a relatively small amount of inorganic filler is used, the effects on the properties of the final composition are minimized, while adding a relatively large amount of inorganic filler will increase those effects. In those cases where adding the inorganic filler will tend to detract from a critical physical parameter, such as tensile strength or flexibility, only so much of the filler should be added in order to reduce the cost of the resulting composition, while retaining adequate mechanical properties required by the intended use. However, in those cases where adding the inorganic filler will improve one or more desired physical properties of a given application, such as stiffness, compressive strength, dead-fold, and/or breathability, it may be desirable to increase the quantity of added filler in order to provide this desired property while also proving greatly decreased cost.

It will be appreciated that one of ordinary skill in the art, using a microstructural engineering approach, can select the types and amount of the various inorganic fillers that may be included within the polymer blend in order to engineer a final material having the desired properties while taking advantage of the cost-reducing properties of adding the inorganic filler.

In general, in order to maximize the quantity of inorganic filler while minimizing the deleterious mechanical effects of adding the filler as much as possible, it may be advantageous to select filler particles in a manner that decreases the specific surface area of the particles. The specific surface area is defined as the ratio of the total particle surface area versus the total particle volume. One way to decrease the specific surface area is to select particles that have a more uniform surface geometry. The more jagged and irregular the particle surface geometry, the greater will be the ratio of surface area to volume of that particle. Another way to decrease the specific surface area is to increase the particle size. In view of the advantages of decreasing the specific surface area of the inorganic filler, it will be preferable to include inorganic filler particles having a specific surface area in a range from about 0.1 $m^2/g$ to about 400 $m^2/g$, more preferably in range from about 0.15 $m^2/g$ to about 50 $m^2/g$, and most preferably in a range from about 0.2 $m^2/g$ to about 2 $m^2/g$.

Related to decreased specific surface area in improving the rheology and final strength properties of the polymer blends of the present invention is the concept of particle packing. Particle packing techniques allow for a reduction in "wasted" interstitial space between particles while maintaining adequate particle lubrication and, hence, mixture rheology, within the melted polymer blend, while also allowing for more efficient use of the thermoplastic phase as a binder in the final hardened polymer blends of the present invention. Simply stated, particle packing is the process of selecting one or more ranges of particle sizes in order that the spaces between a group of larger particles are substantially occupied by a selected group of smaller particles.

In order to optimize the packing density of the inorganic filler particles, differently sized particles having sizes ranging from as small as about 0.01 micron to as large as about 2 mm may be used. Of course, the thickness and other physical parameters of the desired article to be manufactured from any given polymer blend may often dictate the upper particle size limit. In general, the particle packing will be increased whenever any given set of particles is mixed with another set of particles having an average particle size (i.e., width and/or length) that is at least about 2 times bigger or smaller than the average particle size of the first group of particles. The particle packing density for a two-particle system will be maximized whenever the size ratio of a given set of particles is from about 3 -10 times the size of another set of particles. Similarly, three or more different sets of particles may be used to further increase the particle packing density.

The degree of packing density that will be "optimal" will depend on a number of factors including, but not limited to, the types and concentrations of the various components within both the thermoplastic phase and the solid filler phase, the shaping method that will be employed, and the desired mechanical and other performance properties of the final articles to be manufactured from a given polymer blend. One of ordinary skill in the art will be able to determine the optimal level of particle packing that will optimize the packing density through routine testing. A more detailed discussion of particle packing techniques can be found in U.S. Pat. No. 5,527,387 to Andersen et al. For purposes of disclosing particle packing techniques that may be useful in maximizing or optimizing particle packing density, the foregoing patent is incorporated herein by reference.

In those cases where it is desired to take advantage of the improved properties of rheology and binding efficiency utilizing particle packing techniques, it will be preferable to include inorganic filler particles having a natural particle packing density in a range from about 0.55 to about 0.95, more preferably in range from about 0.6 to about 0.9, and most preferably in a range from about 0.7 to about 0.85.

Examples of useful inorganic fillers that may be included within the biodegradable polymer blends include such disparate materials as sand, gravel, crushed rock, bauxite, granite, limestone, sandstone, glass beads, aerogels, xerogels, mica, clay, alumina, silica, kaolin, microspheres, hollow glass spheres, porous ceramic spheres, gypsum dihydrate, insoluble salts, calcium carbonate, magnesium carbonate, calcium hydroxide, calcium aluminate, magnesium carbonate, titanium dioxide, talc, ceramic materials, pozzolanic materials, salts, zirconium compounds, xonotlite (a crystalline calcium silicate gel), lightweight expanded clays, perlite, vermiculite, hydrated or unhydrated hydraulic cement particles, pumice, zeolites, exfoliated rock, ores, minerals, and other geologic materials. A wide variety of other inorganic fillers may be added to the polymer blends, including materials such as metals and metal alloys (e.g., stainless steel, iron, and copper), balls or hollow spherical materials (such as glass, polymers, and metals), filings, pellets, flakes and powders (such as microsilica).

The particle size or range of particle sizes of the inorganic fillers will depend on the wall thickness of the film, sheet, or other article that is to be manufactured from the polymer blend. In general, the larger the wall thickness, the larger will be the acceptable particle size. In most cases, it will be preferable to maximize the particle size within the acceptable range of particle sizes for a given application in order to reduce the cost and specific surface area of the inorganic filler. For films that are intended to have a substantial amount of flexibility, tensile strength, bending endurance and relatively low dead-fold and breathability (e.g., plastic bags) the particle size diameter of the inorganic filler will preferably be less than about 20% of the wall thickness of the film. For example, for a film or sheet having a thickness of 40 microns, it will be preferable for the inorganic filler particles to have a particle size diameter of about 8 microns or less.

On the other hand, it may be desirable in some cases for at least a portion of the filler particles to have a particle size diameter that is equal to or greater than the thickness of the polymeric sheet or film. Utilizing filler particles whose diameters equal or exceed the thickness of the polymeric sheet or film disrupts the surface of the sheet or film and increases the surface area, which can advantageously increase the bulk-hand-feel and/or dead-fold properties of the sheet or film. In the case where the sheets or films are mono or biaxial stretched, the use of larger filler particles creates definitive discontinuities that yield sheets and films having a high degree of cavitation. Cavitation results in sheets having a touch and feel that more closely resembles the touch and feel of paper. In addition, it greatly increases the breathability and water vapor transmission of the sheets and films.

The amount of particulate filler added to a polymer blend will depend on a variety of factors, including the quantity and identities of the other added components, as well as the specific surface area, packing density, and/or size distribution of the filler particles themselves. Accordingly, the concentration of particulate filler within the polymer blends of the present invention may be included in a broad range from as low as 0% by volume to as high as about 90% by volume of the polymer blend. Because of the variations in density of the various inorganic fillers than can be used, it may be more correct in some instances to express the concentration of the inorganic filler in terms of weight percent rather than volume percent. In view of this, the inorganic filler components can be included within a broad range from as low as 0% by weight to as high as 95% by weight of the polymer blend, preferably in a range from about 5% to about 90% by weight.

In those cases where it is desired for the properties of the thermoplastic phase to predominate due to the required performance criteria of the articles being manufactured, the inorganic filler will preferably be included in an amount in a range from about 5% to about 50% by volume of polymer blend. On the other hand, where it is desired to create highly inorganically filled systems, the inorganic filler will preferably be included in an amount in a range from about 50% to about 90% by volume.

In light of these competing objectives, the actual preferred quantity of inorganic filler may vary widely. In general terms, however, in order to appreciably decrease the cost of the resulting polymer blend and/or to impart increased dead-fold, the inorganic filler component will typically be included in an amount greater than about 10% by weight of the overall composition, preferably in an amount greater than about 15% by weight, more preferably in an amount greater than about 20% by weight, more especially preferably greater than about 30% by weight, and most preferably in an amount greater than about 35% by weight of the overall composition.

2. Fibers

A wide range of fibers can optionally be used in order to improve the physical properties of the polymer blends. Like the aforementioned fillers, fibers will typically constitute a solid phase that is separate and distinct from the thermoplastic phase. However, because of the shape of fibers, i.e., by having an aspect ratio greater than at least about 10:1, they are better able to impart strength and toughness than particulate fillers. As used in the specification and the appended claims, the terms "fibers" and "fibrous material" include both inorganic fibers and organic fibers. Fibers may be added to the moldable mixture to increase the flexibility, ductility, bendability, cohesion, elongation ability, deflection ability, toughness, dead-fold, and fracture energy, as well as the flexural and tensile strengths of the resulting sheets and articles.

Fibers that may be incorporated into the polymer blends include naturally occurring organic fibers, such as cellulosic fibers extracted from wood, plant leaves, and plant stems. In addition, inorganic fibers made from glass, graphite, silica, ceramic, rock wool, or metal materials may also be used. Preferred fibers include cotton, wood fibers (both hardwood or softwood fibers, examples of which include southern hardwood and southern pine), flax, abaca, sisal, ramie, hemp, and bagasse because they readily decompose under normal conditions. Even recycled paper fibers can be used in many cases and are extremely inexpensive and plentiful. The fibers may include one or more filaments, fabrics, mesh or mats, and which may be co-extruded, or otherwise blended with or impregnated into, the polymer blends of the present invention.

The fibers used in making the sheets and other articles of the present invention preferably have a high length to width ratio (or "aspect ratio") because longer, narrower fibers can impart more strength to the polymer blend while adding significantly less bulk and mass to the matrix than thicker fibers. The fibers will have an aspect ratio of at least about 10:1, preferably greater than about 25:1, more preferably greater than about 50:1, and most preferably greater than about 100:1.

The amount of fibers added to the polymer blends will vary depending upon the desired properties of the final molded article, with tensile strength, toughness, flexibility, and cost being the principle criteria for determining the amount of fiber to be added in any mix design. Accordingly, the concentration of fibers within the polymer blends of the present invention can be included in a broad range from 0% to about 90% by weight of the polymer blend. If included at all, fibers will preferably be included in an amount in a range from about 1% to about 80% by weight of the polymer blend, more preferably in a range from about 3% to about 50% by weight, and most preferably in a range from about 5% to about 30% by weight of the polymer blend.

3. Organic Fillers

The polymer blends of the present invention may also include a wide range of organic fillers. Depending on the melting points of the polymer blend and organic filler being added, the organic filler may remain as a discrete particle and constitute a solid phase separate from the thermoplastic phase, or it may partially or wholly melt and become partially or wholly associated with the thermoplastic phase.

Organic fillers may comprise a wide variety of natural occurring organic fillers such as, for example, seagel, cork, seeds, gelatins, wood flour, saw dust, milled polymeric materials, agar-based materials, native starch granules, pregelatinized and dried starch, expandable particles, and the like. Organic fillers may also include one or more synthetic polymers of which there is virtually endless variety. Because of the diverse nature of organic fillers, there will not generally be a preferred concentration range for the optional organic filler component.

Organic fillers can partially or wholly take the place of inorganic fillers. In some cases, organic fillers can be selected that will impart the same properties as inorganic fillers, such as to increase dead-fold, the bulk hand feel, breathability and water vapor transmission. When included at all, the organic filler component will typically be included in an amount greater than about 5% by weight of the overall composition, preferably in an amount greater than about 10% by weight, more preferably in an amount greater than about 20% by weight, and most preferably greater than about 30% by weight of the overall composition.

C. Natural Polymers.

In addition to thermoplastic starch or starch particles, other natural polymers that may be used within the polymer blends of the present invention comprise or are derivatives of cellulose, other polysaccharides, polysaccharide gums and proteins.

Examples of starches and starch derivatives include, but are not limited to, modified starches, cationic and anionic starches, and starch esters such as starch acetate, starch hydroxyethyl ether, alkyl starches, dextrins, amine starches, phosphates starches, and dialdehyde starches.

Examples of derivatives of cellulose include, but are not limited to, cellulosic esters (e.g., cellulose formate, cellulose acetate, cellulose diacetate, cellulose propionate, cellulose butyrate, cellulose valerate, mixed esters, and mixtures thereof) and cellulosic ethers (e.g., methylhydroxyethylcellulose, hydroxymethylethylcellulose, carboxymethylcellulose, methylcellulose, ethylcellulose, hydroxyethylcellulose, hydroxyethylpropylcellulose, and mixtures thereof).

Other polysaccharide-based polymers that can be incorporated into the polymer blends of the invention include alginic acid, alginates, phycocolloids, agar, gum arabic, guar gum, acacia gum, carrageenan gum, furcellaran gum, ghatti gum, psyllium gum, quince gum, tamarind gum, locust bean gum, gum karaya, xanthan gum, and gum tragacanth, and mixtures or derivatives thereof.

Suitable protein-based polymers include, for example, Zein® (a prolamine derived from corn), collagen (extracted from animal connective tissue and bones) and derivatives thereof such as gelatin and glue, casein (the principle protein in cow milk), sunflower protein, egg protein, soybean protein, vegetable gelatins, gluten and mixtures or derivatives thereof.

D. Non Biodegradable Polymers.

Although polymer blends according to the invention preferably include biodegradable polymers, it is certainly within the scope of the invention to include one or more polymers which are not biodegradable. If the nonbiodegradable polymer generally comprises a disperse phase rather than the dominant continuous phase, polymer blends including a nonbiodegradable polymer will nevertheless be biodegradable, at least in part. When degraded, the polymer blend may leave behind a nonbiodegradable residue that nevertheless is superior to the waste left behind by sheets and films that are entirely made of nonbiodegradable polymers.

Examples of common nonbiodegradable polymers suitable for forming sheets and films include, but are not limited to, polyethylene, polypropylene, polybutylene, PET, PETG, PETE, polyvinyl chloride, PVDC, polystyrene, polyamides, nylon, polycarbonates, polysulfides, polysulfones, copolymers including one or more of the foregoing, and the like.

IV. Polymer Blends

A. Concentration Ranges of Biopolymers.

The concentrations of the various components within the polymer blend will depend on a number of factors, including the desired physical and mechanical properties of the final blend, the performance criteria of articles to be manufactured from a particular blend, the processing equipment used to manufacture and convert the blend into the desired article of manufacture, and the particular components within the blend. One of ordinary skill in the art will be able, in light of the specific examples and other teachings disclosed herein, to select and optimize the concentrations of the various components through routine testing.

In view of the wide variety of polymer blends within the scope of the invention, as well as the wide variety of different properties that may be engineered within the blends, the hard and soft polymers may be included within widely varying concentration ranges. The one or more stiff polymers within the inventive blends will preferably have a concentration in a range from about 20% to about 99% by weight of the biodegradable polymer blend, more preferably in a range from about 55% to about 98% by weight, and most preferably in a range from about 70% to about 95% by weight of the polymer blend.

Similarly, the soft polymers will preferably have a concentration in a range from about 1% to about 80% by weight of the biodegradable polymer blend, more preferably in a range from about 2% to about 45% by weight, and most preferably in a range from about 5% to about 30% by weight of the polymer blend.

The foregoing ranges are measured in terms of the blend of hard and soft polymers exclusive of any optional components that may be added, as described and identified above. In the case where only a single biopolymer is used the foregoing ranges to do not apply.

B. Properties of the Polymer Blends.

The polymer blends may be engineered to have any desired property. The properties of the final article of manufacture will depend on a number of factors, including mix design, processing conditions, post-formation processing, product size, particularly thickness, and the like. In the case of sheets or films intended to be used as "wraps", such as wraps used to enclose meats, other perishable food items, and especially fast food items (e.g., sandwiches, burgers and dessert items), it will generally be desirable to provide sheets and films having good "dead-fold" properties so that once folded, wrapped or otherwise manipulated into a desired orientation, such wraps will tend to maintain their orientation so as to not spontaneously unfold or unwrap, as which occurs with a large number of plastic sheets and films (e.g., polyethylene).

In order to improve the dead-fold properties of sheets or films produced therefrom, biopolymers may be selected which yield blends having a relatively high Young's modulus, preferably greater than about 100 MPa, more preferably greater than about 150 MPa, and most preferably greater than about 200 MPa. In general, increasing the concentration of the stiff biopolymer will tend to increase the Young's modulus. The Young's modulus may also be increased by loading the polymer blends with one or more fillers, such as particulate or fibrous fillers, as described above.

In addition to, or instead of, increasing the Young's modulus to improve dead-fold, the sheets or films according to the invention may be optionally processed to increase the "bulk hand feel" of a sheet, which is done by disrupting the generally planar nature of the sheet or film. This can be done, for example, by embossing, crimping, quilting or otherwise texturing the sheet so as to have regularly spaced-apart or random hills and valleys rather than simply a smooth, planar sheet. This may be done, for example, by passing the sheet or film through a pair of knurled or other embossing-type rollers. Such texturing increases the ability of a sheet to take and maintain a fold, crinkle, creases or other bend, thus improving the dead-fold properties of the sheet.

Another way to increase the surface area of the sheets or films according to the invention so as to increase their bulk hand feel and/or dead-fold is to include particulate fillers in which at least a portion of the particles have a particle size diameter that equals or exceeds the thickness of the polymer film or sheet. In this way, sheets and films can be manufactured that have dead-fold approaching or equaling 100%, which exceeds the dead-fold properties of virtually all conventional paper or plastic wraps and sheets currently on the market. A rare example of a conventional sheet or wrap having 100% dead-fold is aluminum or other metal foils.

The use of fillers coupled with specific processing techniques can be used to create "cavitation". Cavitation occurs as the thermoplastic polymer fraction is pulled in either a monoaxial or biaxial direction and the filler particles create a discontinuity in the film or sheet that increases in size during stretching. During stretching, a portion of the stretched polymer pulls away from the filler particles, resulting in tiny cavities in the vicinity of the filler particles. This, in turn, results in greatly increased breathability and vapor transmission of the sheets and films. It also results in films or sheets having a touch and feel that much more closely resembles the touch and feel of paper, as contrasted with conventional plastic sheets and films. The result is a sheet, film or wrap that can be used for applications that are presently performed or satisfied using paper products (i.e., wraps, tissues, printed materials, etc.)

Articles of manufacture made according to the invention can have any desired thickness. Thicknesses of sheets and films may range from 0.0001" to 0.1" (about 2.5 microns to about 2.5 mm). Sheets and films suitable for wrapping, enclosing or otherwise covering food items or other solid substrates will typically have a measured thickness between about 0.0003" and about 0.01" (about 7.5-250 microns), and a calculated thickness between about 0.00015" and about 0.005" (about 4-125 microns). The measured thickness will typically be between 10-100% larger than the calculated thickness when the sheets and films are made from compositions that have a relatively high concentration of particulate filler particles, which can protrude from the surface of the sheet or film. This phenomenon is especially pronounced when significant quantities of filler particles having a particle size diameter that is larger than the thickness of the polymer matrix are used.

In view of the foregoing, sheets and films suitable for use as wraps will preferably have a measured thickness in a range from about 0.0004" to about 0.005" (about 10 to about 125 microns), more preferably in a range from about 0.0005" to about 0.003" (about 12 to about 75 microns), and most preferably in a range from about 0.001" to about 0.002" (about 25 to about 50 microns). On the other hand, sheets and films suitable for use as wraps will preferably have a calculated thickness in a range from about 0.0002" to about 0.003" (about 5 to about 75 microns), more preferably in a range from about 0.0003" to about 0.002" (about 7.5 to about 50 microns), and most preferably in a range from about 0.0005" to about 0.0015" (about 12 to about 40 microns).

The difference between the calculated and measured thickness tends to increase with increasing filler content and also with increasing particle size. Conversely, the difference between the calculated and measured thickness tends to decrease with decreasing filler content and also with decreasing particle size. Sheets and films that include no fillers, or lower quantities of fillers having a particle size diameter that is substantially lower than the thickness of the polymer matrix, will have a measured thickness that is similar or equal to the calculated thickness.

Another important property of the biodegradable blends according to the invention is that when such blends are blown, extruded, cast, or otherwise formed into sheets and films, such sheets and films are readily printable without further processing. Thus, another advantage of utilizing the inventive polymer blends in the manufacture of wraps is that such blends are generally able to accept and retain print much more easily than conventional plastics or waxed papers. Many plastics and waxes are highly hydrophobic and must be surface oxidized in order to provide a chemically receptive surface to which ink can adhere. Biopolymers, on the other hand, typically include oxygen-containing moieties, such as ester or amide groups, to which inks can readily adhere.

C. Measuring Dead-Fold

The term "dead-fold" refers to the tendency of a sheet or film to maintain a crease, crinkle, fold or other bend. The dead-fold properties of sheets and films can be accurately measured using a standard test known in the art. This test provides the ability to compare and contrast the dead-fold properties of various sheets and films. The following equipment is useful in performing the standard dead-fold test: (1) a semicircular protractor, divided along a 1" diameter semicircle; (2) a weight consisting of a smooth-faced metal block that is 0.75±0.05" by 1.25±0.05" and of such a thickness so as to weigh 50 g±0.05 g; (3) a 1"×4" template for cutting test specimens; (4) a timer or stopwatch capable of timing to 1 second; (5) a utility knife or other cutting tool; and (6) a humidity chamber.

The first step is preparation of an appropriately sized sample. In the case where a film has different properties in the machine direction compared to the cross-machine direction it may be useful to measure and average the dead-fold properties in both directions. The standard sample specimen is a 1"×4" strip of the sheet or film to be tested.

The second step is a conditioning step in order to ensure uniformity of test conditions. The specimens are conditioned by placing them in a humidity chamber at 23° C. and 50% relative humidity for a minimum of 24 hours.

The third step is the actual dead-fold test of each conditioned test strip. The specimen is removed from the humidity chamber and its weight recorded. A light mark is made 1" from one end of the test strip. The test strip is then placed on a flat surface and bent over at the mark but without creasing the strip. Next, the weight is placed squarely and gently over the bend with two thirds (or 0.5") of the weight overlapping the specimen so that a crease is formed, and with one third or (0.25") of the weight overhanging the crease. The edges of the weight parallel to the strip should project evenly (about 0.125") beyond each side of the strip. The weight is allowed to rest on the specimen for 10 seconds. Then it is removed. After exactly 30 seconds, the angle formed by the crease is measured.

The foregoing process is repeated using the other side of the strip and using as many additional strips as will give a statistically accurate measure of the dead-fold properties of a given sheet or film. The average angle A is then input into the following formula to determine the percentage dead-fold C for a given sample:

$$C = 100*(180-A)/180$$

If the angle A is 0° (i.e., where the crease is maintained so that no spring back is observed), the sample has 100% dead-fold ($C=100*(180-0)/180=100\%$). At the other extreme, if the angle A is 180° (i.e., where the sample springs all the way back so that the sample is essentially flat, the sample has 0% dead-fold ($C=100*(180-180)/180=0\%$). In the middle, a sample that springs back half way so as to form a right angle has 50% dead-fold ($C=100*(180-90)/180=50\%$).

When used to wrap foods, or whenever good dead-fold properties are desired, sheets and films according to the invention can be manufactured so as to have a dead-fold of at least about 50%. Preferably, such sheets and films will have a dead-fold greater than about 60%, more preferably greater than about 70%, and most preferably greater than about 80%. Sheets and films according to the invention have been developed that have a dead-fold approaching or equal to 100%. By way of comparison, sheets and films made from polyethylene (e.g., for use in making sandwich or garbage bags) typically have a dead-fold of 0%. Standard paper wraps commonly used in the fast food industry typically have a dead-fold between about 40-80%. Thus, sheets and films according to the invention can be manufactured so as to have dead-fold properties that meet or exceed those of standard paper wraps, and which are many times greater than conventional plastic films and sheets, often orders of magnitude greater.

D. Methods of Manufacturing Polymer Blends, Sheets and Films.

It is within the scope of the invention to employ any mixing apparatus known in the art of manufacturing thermoplastic compositions in order to form the polymer blends of the invention. Examples of suitable mixing apparatus that can be used to form the blends according to the invention include a twin-shafted kneader with meshing screws having kneading blocks sold by the Buss Company, a BRABENDER mixer, a THEYSOHN TSK 045 compounder, which is a twin-shaft extruder with shafts rotating in the same direction and which has multiple heating and processing zones, a BUSS KO Kneader having a heatable auger screw, a BAKER-PERKINS MPC/V-30 double and single auger extruder, single or twin auger OMC extruders, a Model EPV 60/36D extruder, a BATTAGGION ME100 direct-current slow mixer, a HAAKE Reomex extruder, a COLLIN Blown Film Extruder, a BATTENFELD-GLOUCESTER Blown Film Extruder, and a BLACK-CLAWSON Cast Film Extruder.

Many of the foregoing mixers are also extruders, which makes them suitable for extruding films or sheets from the inventive blends according to the invention. Alternatively, these blends can be made using transfer-line-injection technology where resin manufacturers can inject the various minor components of these blends into the main poly components during manufacture. One of ordinary skill in the art will be able to select and optimize an appropriate manufacturing apparatus according to the desired article to be manufactured. Once a thermoplastic melt has been formed using any of the above-mentioned mixers, or any other appropriate mixing and melting apparatus known in the thermoplastic art, virtually any molding, extrusion or shaping apparatus known in the thermoplastic molding or processing art can be used to produce finished articles of manufacture.

In a preferred embodiment for manufacturing sheets and films, the sheets and films may be manufactured using a compounding twin screw extruder to prepare the blends, and a blown film or cast film line to make the films and sheets. Blown films and sheets tend to have similar, if not identical, strength and other performance properties in the biaxial direction due to how they are processed (i.e., they are extruded as a tube and then expanded in all directions by blowing air within the confines of the tube, causing it to expand like a balloon). Cast films or sheets, on the other hand, unless subjected to biaxial stretching, will be substantially stronger (e.g. will have substantially greater tensile strength) in the machine direction and will be substantially more tear resistant in the cross-machine direction. When extruding a thermoplastic material, the polymer molecules tend to be oriented in the machine direction. Machine direction orientation is further increased if the extruded sheet or film is passed through a nip to decrease the sheet or film thickness in the machine direction.

The sheets and films according to the invention may comprise a single layer or multiple layers as desired. They may be formed by mono- and co-extrusion, casting and film blowing techniques known in the art. Because they are thermoplastic, the sheets can be post-treated by heat sealing to join two ends together to form sacks, pockets, pouches, and the like. They can be laminated onto existing sheets or substrates. They can also be coated themselves.

Monoaxial or biaxial stretching of sheets and films can be used to create cavitation. Cavitation increase the breathability and vapor transmission of the sheets and films. It also results in films or sheets having a touch and feel that much more closely resembles the touch and feel of paper compared to conventional thermoplastic sheets and films.

V. EXAMPLES OF THE PREFERRED EMBODIMENTS

The following examples are presented in order to more specifically teach compositions and process conditions for forming the biodegradable blends according to the present invention, as well as articles therefrom. The examples include various mix designs of the inventive biodegradable polymer blends as well various processes for manufacturing the blends and then forming sheets and films therefrom.

Examples 1-3

Films were manufactured from biodegradable polymer blends having the following mix designs, with the concentrations being expressed in terms of weight percent of the entire polymer blend:

| Example | Biomax 6926 | Ecoflex-F | SiO$_2$ |
|---------|-------------|-----------|---------|
| 1 | 94.84% | 5% | 0.16% |
| 2 | 89.84% | 10% | 0.16% |
| 3 | 79.84% | 20% | 0.16% |

The foregoing polymer blends were blended and blown into films at Gemini Plastics, located in Maywood, Calif., using DuPont supplied BIOMAX 6926 (both new and old lots), a silica master batch in BIOMAX 6926 base resin supplied by DuPont, and ECOFLEX-F resin obtained from BASF. The films were blown using a Gemini film blowing extruder (L/D 24/1) equipped with a 2 inch barrier mixing screw containing a Maddock shear mixing tip, and a 4 inch diameter annular die with a die gap of 0.032-0.035".

Even though a typical quantity of silica antiblock was used (i.e., 0.16%), significant blocking of the film was observed for the film made using the mix design of Example 3 (i.e. 20% ECOFLEX); however, there was no observed blocking of the 5 and 10% ECOFLEX blends of Examples 1 and 2. For purposes of comparison, films of neat ECOFLEX and BIOMAX were manufactured. The neat ECOFLEX films were manufactured using BASF ECOFLEX-F resin and a 30% talc master batch in the same resin. The neat BIOMAX films (new and old) included 0.16% SiO$_2$, while the neat ECOFLEX films included 4.5% talc. The mechanical properties of the BIOMAX/ECOFLEX blend films and the control BIOMAX and neat ECOFLEX-F films were measured under ambient conditions. The data generated is show graphically in Charts 1-8 depicted in FIGS. 1-8, respectively.

Chart 1, depicted in FIG. 1, is a plot of the strain rate versus percent elongation at break for the various films tested. At 500 mm/min. strain rate, both new and old BIOMAX films displayed poor elongation. The neat ECOFLEX films and all of the films made from the BIOMAX-ECOFLEX blends had significantly better elongations than the neat BIOMAX films at all of the strain rates studied. On the other hand, the 20% ECOFLEX blend of Example 3 exhibited equal or better elongation compared to the neat ECOFLEX films at lower strain rates, even though these films included nearly 80% BIOMAX, which was shown to have very poor elongation.

Figure 2:
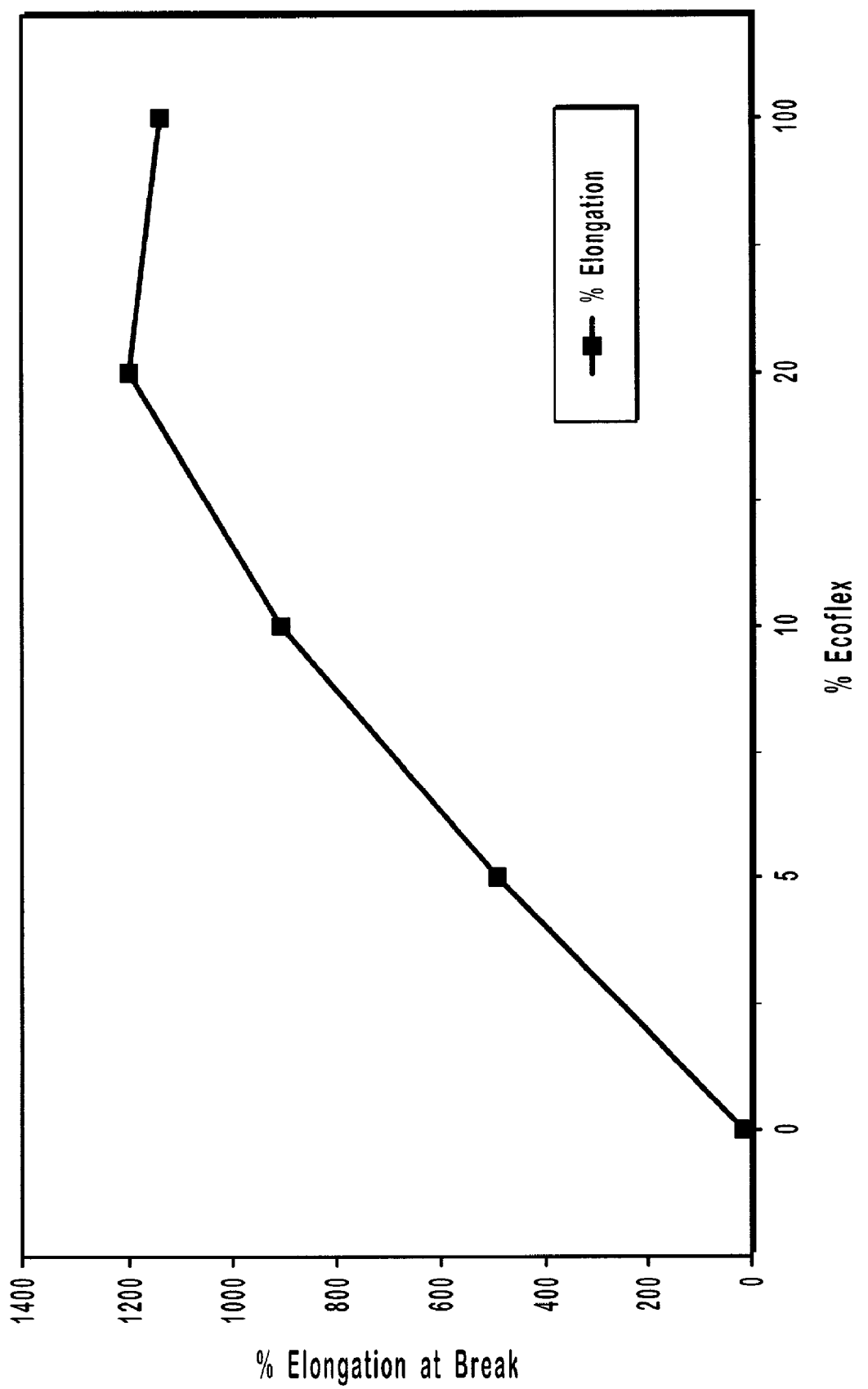
FIG. 2 is a plot of the percent elongation of various neat polymer and blended polymer films versus the concentration of ECOFLEX within the films at a fixed strain rate of 500 mm/min.

Chart 2, depicted in FIG. 2, is a plot of percent elongation versus percentage of ECOFLEX in the BIOMAX/ECOFLEX blends measured at a fixed strain rate of 500 mm/min. As represented by Chart 2, there was a nearly linear improvement in the percent elongation as the concentration of ECOFLEX was increased. Moreover, the 20% ECOFLEX blend of Example 3 had an elongation as good as the neat ECOFLEX films.

Figure 3:
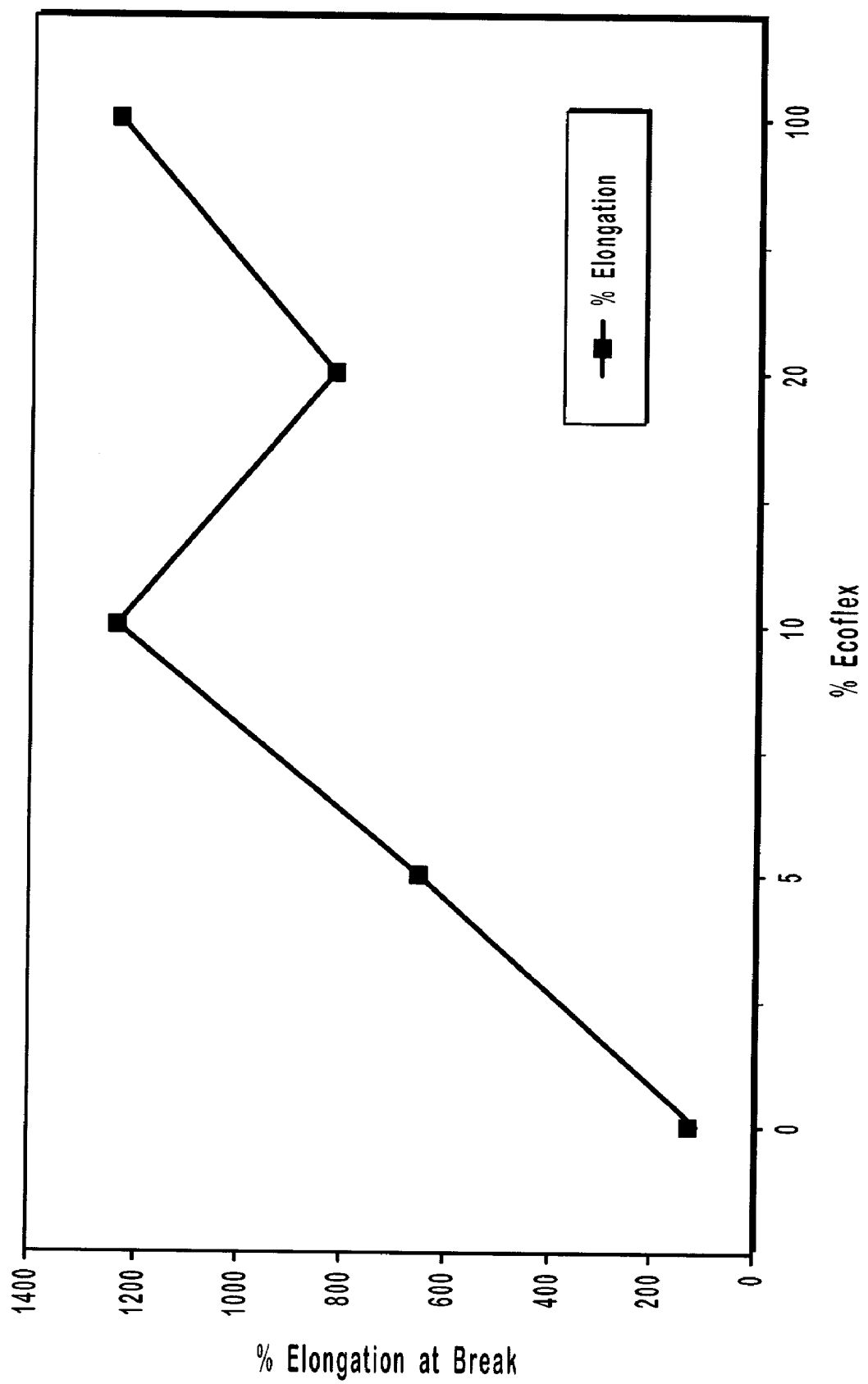
FIG. 3 is a plot of the percent elongation of various neat polymer and blended polymer films versus the concentration of ECOFLEX within the films at a fixed strain rate of 1000 mm/min.

Chart 3, depicted in FIG. 3, similarly plots the percent elongation versus the percentage of ECOFLEX in the BIOMAX/ECOFLEX blends measured at a fixed strain rate of 1000 mm/min. Again, a dramatic improvement in the elongation of the BIOMAX/ECOFLEX blend was seen as the concentration of ECOFLEX reached 10 and 20%, respectively, although the trend was not as clear as the data in Chart 2, measured at a fixed strain rate of 500 mm/min.

Figure 4:
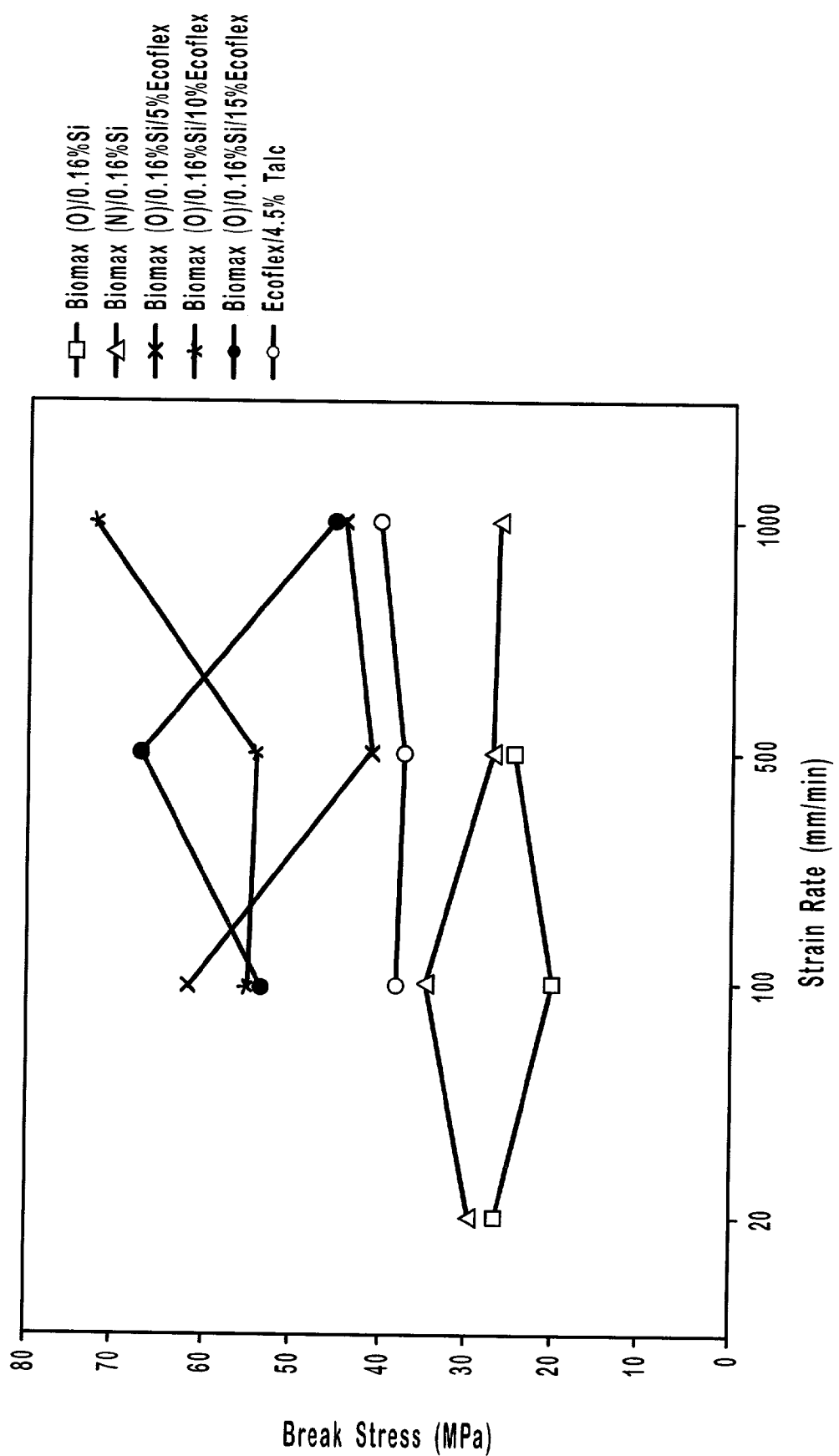
FIG. 4 is a plot of the break stress versus the applied strain rate for various neat and blended polymer films.

Chart 4, depicted in FIG. 4, is a plot of the strain rate versus break stress of the various films. Again, neat ECOFLEX and all of the BIOMAX/ECOFLEX blends had significantly better break stress than the neat BIOMAX films at all of the strain rates studied. Moreover, the BIOMAX/

ECOFLEX blends had significantly better break stress than the neat ECOFLEX films at all strain rates, thus showing that the BIOMAX/ECOFLEX blends are all stronger in tensile strength than either of neat BIOMAX or ECOFLEX.

Figure 5:
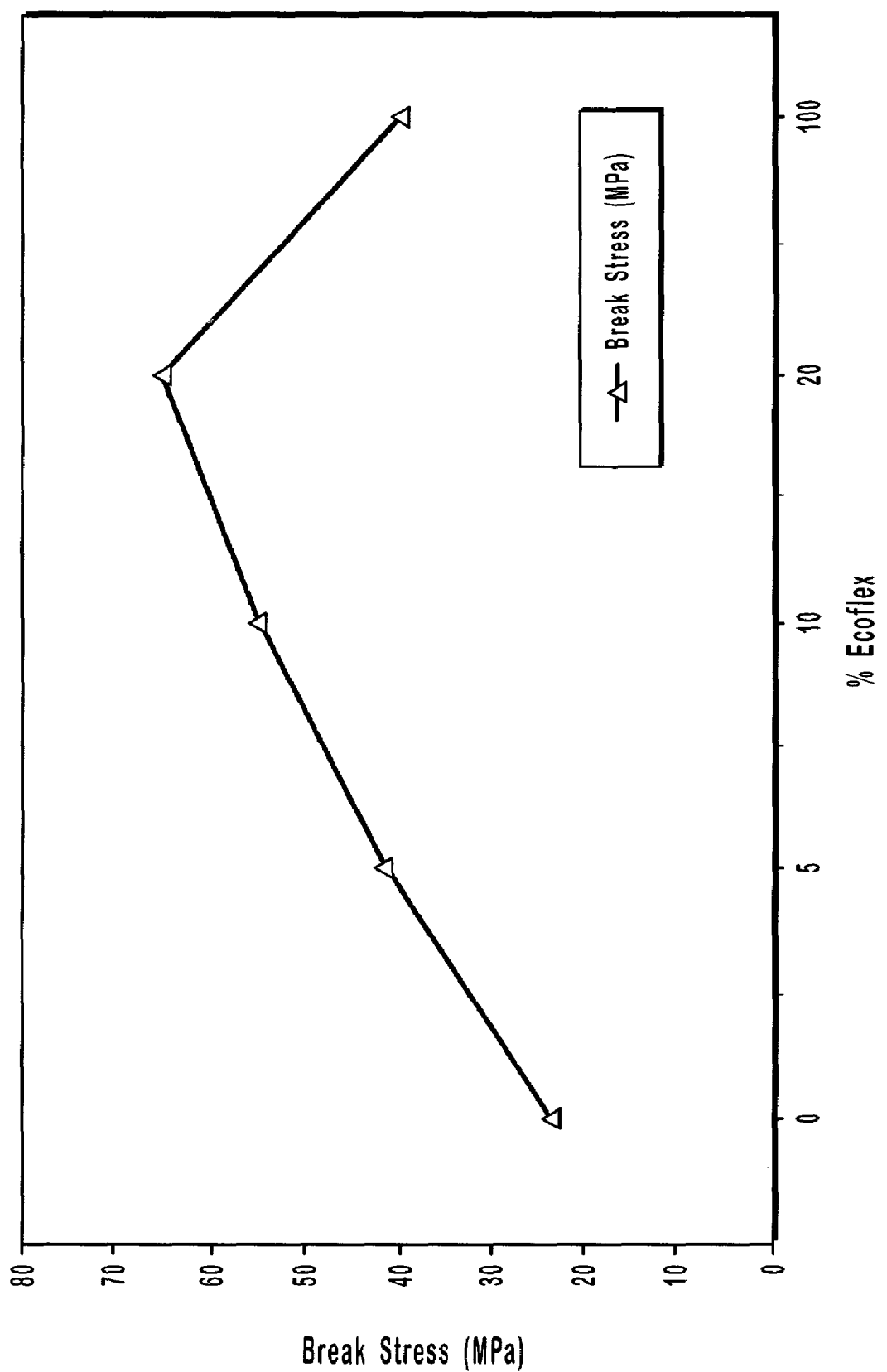
FIG. 5 is a plot of the break stress of various neat polymer and blended polymer films versus the concentration of ECOFLEX within the films at a fixed strain rate of 500 mm/min.

Chart 5, depicted in FIG. 5, is a plot of the break stress versus percent ECOFLEX in the BIOMAX/ECOFLEX blends of Examples 1-3 measured at a fixed strain rate of 500 mm/min. Once again, a nearly linear increase in break stress was observed as the concentration of ECOFLEX was increased. Moreover, the 20% blend of Example 3 exhibited the surprising and unexpected result of having nearly twice the break stress as the neat ECOFLEX film, and nearly three times the break stress as the neat BIOMAX film.

Figure 6:
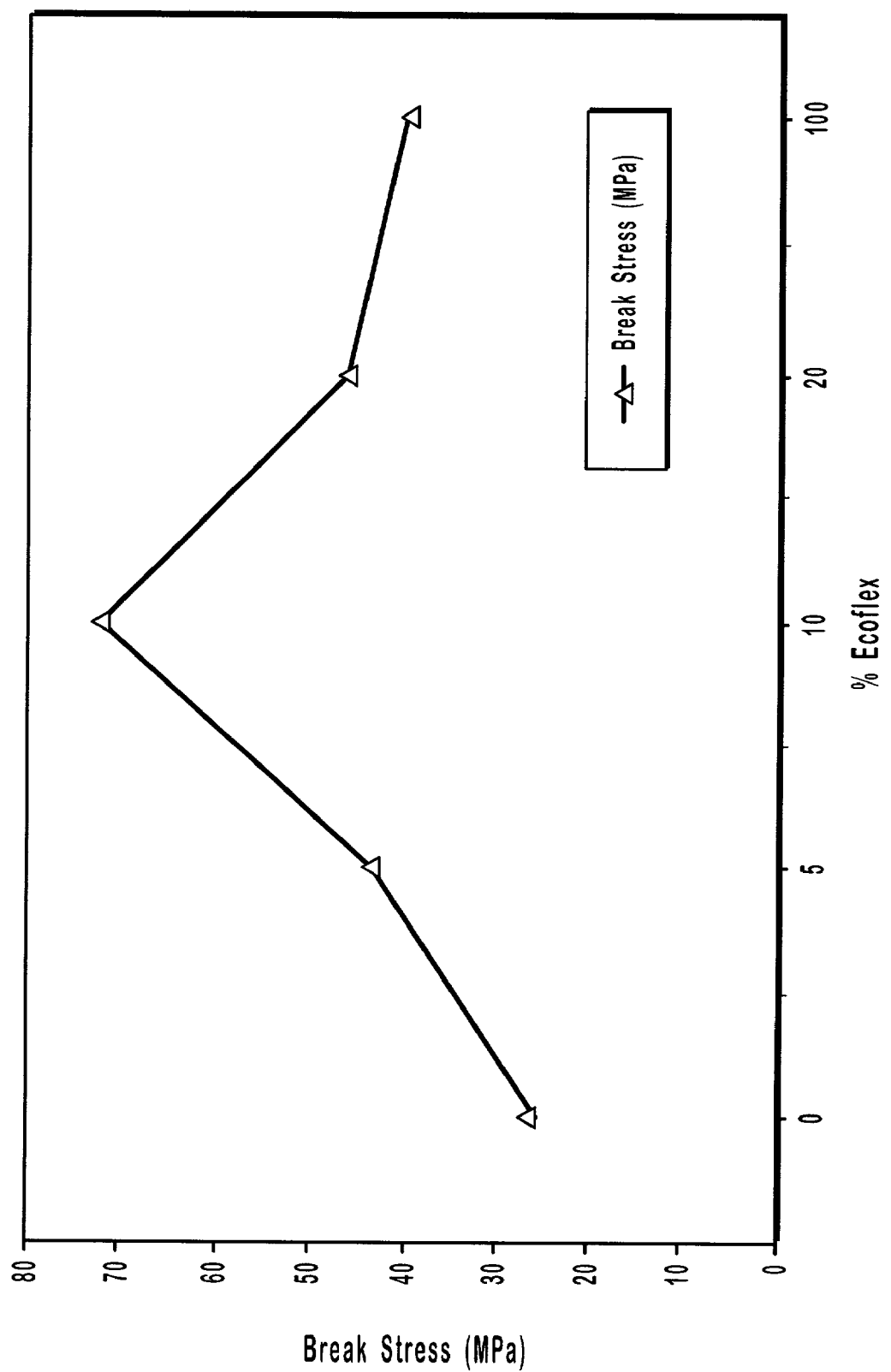
FIG. 6 is a plot of the break stress of various neat polymer and blended polymer films versus the concentration of ECOFLEX within the films at a fixed strain rate of 1000 mm/min.

Chart 6, depicted in FIG. 6, is a plot of the break stress versus percent ECOFLEX in the BIOMAX/ECOFLEX blends of Examples 1-3 measured at a fixed strain rate of 1000 mm/min. At this strain rate, the 10% ECOFLEX blend of Example 2 had the highest break stress, with a maximum peak stress of 72 MPa.

Figure 7:
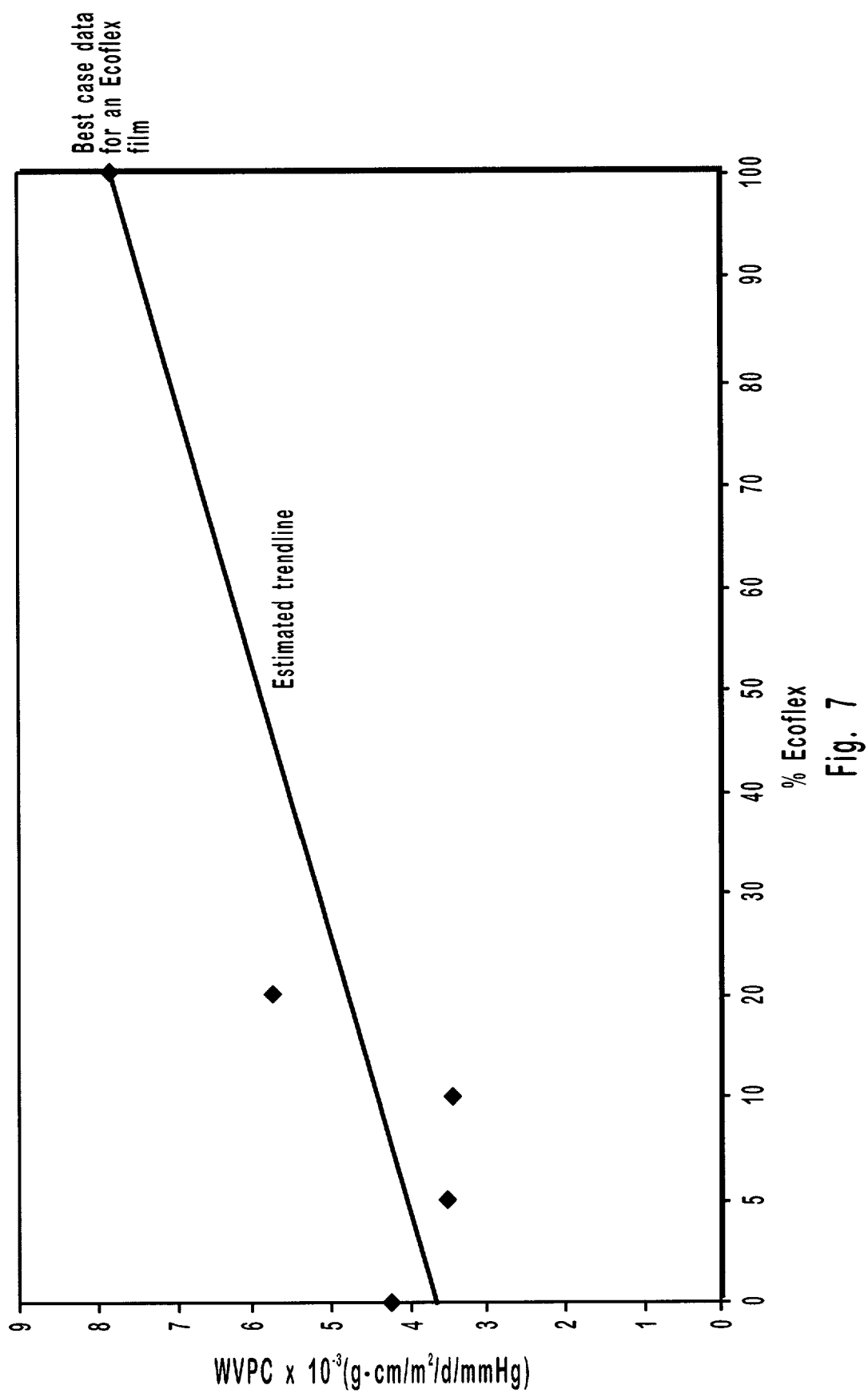
FIG. 7 is a plot of the Water Vapor Permeability Coefficients (WVPC) of various neat polymer and blended polymer films as a function of the concentration of ECOFLEX within the films, and an estimated trend line based on the lowest measured WVPC for a neat ECOFLEX film of $7.79 \times 10^{-3}$ g·cm/m$^2$/d/mm Hg.
Figure 8:
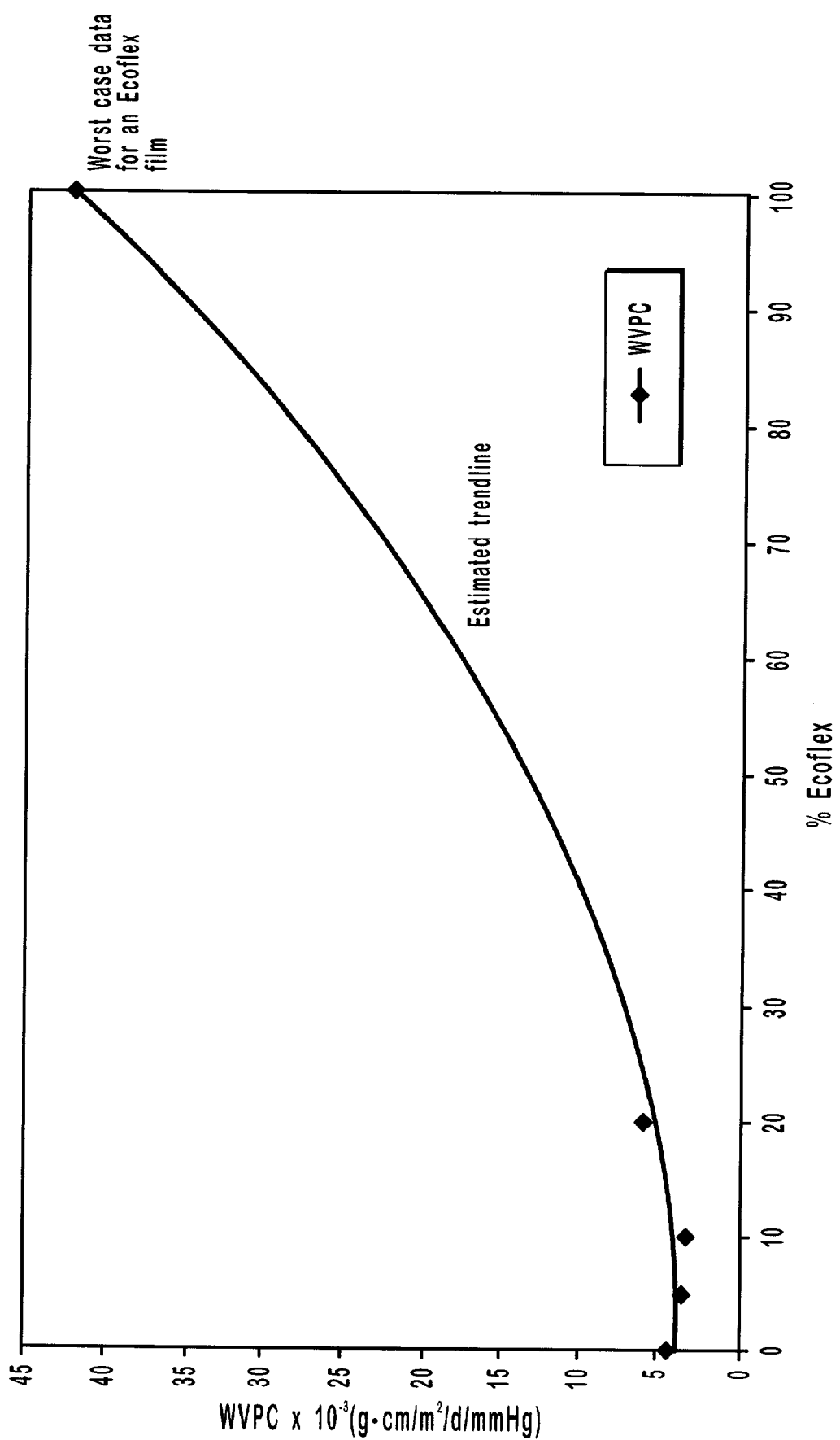
FIG. 8 is a plot of the Water Vapor Permeability Coefficients (WVPC) of various neat polymer and blended polymer films as a function of the concentration of ECOFLEX within the films, and an estimated trend line based on the highest measured WVPC for a neat ECOFLEX film of $42 \times 10^{-3}$ g·cm/m$^2$/d/mm Hg.

Charts 7 and 8, depicted in FIGS. 7 and 8, respectively, plot the water vapor permeability coefficient (WVPC) of the various films as a function of the concentration of ECOFLEX within the films. In Chart 7, the estimated trend line is based on a WVPC of $7.79 \times 10^{-3}$ g·cm/m$^2$/d/mm Hg, which is the lowest measured WVPC for a neat ECOFLEX film. In Chart 8, the estimated trend line is alternatively based on a WVPC of $42 \times 10^{-3}$ g·cm/m$^2$/d/mm Hg, which is the highest measured WVPC for a neat ECOFLEX film. The data in Charts 7 and 8 indicate that the water vapor barrier properties of the 5 and 10% ECOFLEX blends of Examples 1 and 2 were essentially the same as that of the neat BIOMAX film. The WVPC data for all samples were measured by the standard procedures described in the Test Method ASTM F 1249-90.

Figure 9:
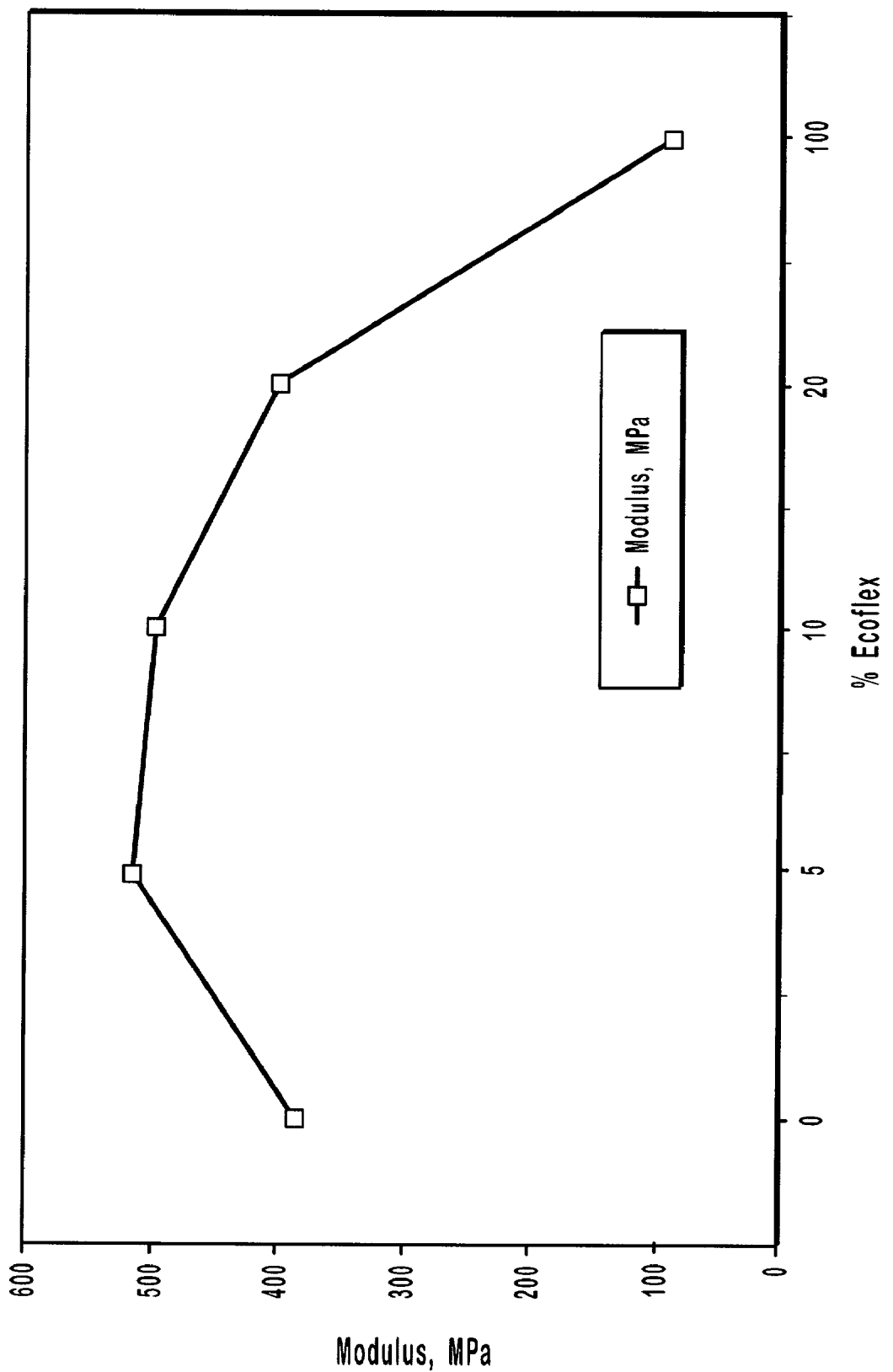
FIG. 9 is a plot of the modulus of various neat polymer and blended polymer films versus the concentration of ECOFLEX within the films.

Chart 9, depicted in FIG. 9, is a plot of the modulus of various films as a function of the concentration of ECOFLEX within the films. Surprisingly, the modulus of blends containing BIOMAX and ECOFLEX are significantly higher than of neat BIOMAX and ECOFLEX. Because one of the uses of the films manufactured according to the present invention is as a wrap having good dead-fold properties, and because the degree of dead-fold is believed to be related to the modulus of a film, blends of BIOMAX and ECOFLEX appear to have superior dead-fold properties over each of the neat BIOMAX and ECOFLEX films, with the 5% and 10% blends exhibiting the highest modulus.

Examples 4-5

Films were manufactured from biodegradable polymer blends having the following mix designs, with the concentrations being expressed in terms of weight percent of the entire polymer blends:

| Example | Biomax 6926 | Ecoflex-F | Talc |
|---------|-------------|-----------|------|
| 4 | 79.7% | 16.7% | 3.6% |
| 5 | 76.7% | 16.7% | 6.6% |

The films were blown using a Gemini film blowing extruder (L/D 24/1) equipped with a 2 inch barrier mixing screw containing a Maddock shear mixing tip, and a 4 inch diameter annular die with a die gap of 0.032-0.035". The film of Example 5 had better dead-fold properties than the film of Example 4, which might be attributable to the higher concentration of talc within the blend used in Example 5.

Example 6

A film was manufactured from a biodegradable polymer blend having the following mix design, with the concentration being expressed in terms of weight percent of the entire polymer blend:

| | |
|---|---|
| ECOFLEX-F | 20% |
| Thermoplastic Starch | 50% |
| Polylactic Acid | 15% |
| Inorganic Filler | 15% |

The Thermoplastic Starch was obtained from Biotec Biologische Natuverpackungen GmbH & Co., KG ("Biotec"), located in Emmerich, Germany. The polylactic acid was obtained from Cargill-Dow Polymers, LLC, located in Midland, Mich., USA. The inorganic filler was calcium carbonate obtained from OMYA, division Pluess-Staufer AG, located in Oftringen, Switzerland.

The foregoing blend was manufactured and blown into sheets using a proprietary extrusion line thermoplastic starch extrusion/film blowing apparatus manufactured and assembled specifically for Biotec. In particular, the extrusion/film blowing apparatus was manufactured by Dr. Collin GmbH, located in Ebersberg, Germany. A detailed description of an extrusion/film blowing apparatus similar to the one used by Biotec is set forth in U.S. Pat. No. 5,525,281 to Lörcks et al. U.S. Pat. No. 6,136,097 to Lörcks et al. discloses processes for manufacturing intermediate thermoplastic starch-containing granulates that can be further processed to make films and sheets. For purposes of disclosure, the foregoing patents are incorporated herein by reference.

The film had a modulus of 215.65 MPa. Thus, it had excellent dead-fold properties as a result of the inclusion of the inorganic filler and the polylactic acid, which is a generally stiff, crystalline polymer at room temperature. As set forth above, PLA has a glass transition temperature between 50-60° C. The ECOFLEX and thermoplastic starch (TPS) both acted as soft, low glass transition temperature polymers. The TPS, when blended with additional polymers and at very low water, has a glass transition temperature approaching −60° C. The ECOFLEX and TPS thus assisted the blowability and flexibility of the blend. The TPS also increased the natural polymer content, thus making the film more biodegradable.

Example 7

A film was manufactured from a biodegradable polymer blend having the following mix design, with the concentration being expressed in terms of weight percent of the entire polymer blend:

| | |
|---|---|
| Thermoplastic Starch | 30% |
| BAK 1095 | 60% |
| Inorganic Filler | 10% |

The thermoplastic starch was obtained from Biotec. The BAK 1095 was obtained from Bayer AG, located in Köln, Germany, and was an aliphatic-aromatic polyesteramide. The inorganic filler was calcium carbonate obtained from OMYA, division Pluess-Staufer AG, located in Oftringen, Switzerland.

The foregoing blend was manufactured and blown into sheets using the proprietary thermoplastic starch extrusion/film blowing apparatus described in Example 6. The film had excellent dead-fold properties as a result of the inclusion of the inorganic filler and the BAK 1095, which is a somewhat stiff, crystalline polymer at room temperature even though it is classified as "film grade". As set forth above, BAK 1095 behaves as if it has a glass transition temperature of at least 10° C. Because the glass transition temperature of BAK 1095 is relatively low compared to PLA, considerably more BAK could be included without destroying the film-blowing properties and flexibility of the resulting film. The TPS acted as the soft, low glass transition temperature polymer, and further assisted the blowability and flexibility of the blend. It also increased the natural polymer content, thus making the film more biodegradable.

Examples 8-12

Films were manufactured from biodegradable polymer blends having the following mix designs, with the concentrations being expressed in term of weight percent of the entire polymer blend:

| Example | Biomax 6926 | Ecoflex F | Talc | TiO$_2$ | CaCO$_3$ |
|---|---|---|---|---|---|
| 8 | 76% | 15% | 4.5% | 4.5% | — |
| 9 | 85.5% | 9.5% | — | 5% | — |
| 10 | 70% | 17.5% | — | 2.5% | 10% |
| 11 | 66% | 16.5% | — | 2.5% | 15% |
| 12 | 58% | 24% | — | 3% | 15% |

The talc was supplied by Luzenac, located in Englewood, Colo., having a particle size of 3.8 microns. The titanium dioxide was supplied by Kerr-McGee Chemical, LLC, located in Oklahoma City, Okla., grade TRONOX 470, having a particle size of 0.17 micron. The calcium carbonate was supplied by Omnia, located in Lucerne Valley, Calif., particle size of 2 microns. The foregoing blends were manufactured on a Werner Pfeiderer ZSK twin-screw extruder, and blown into sheets using a Gemini film blowing extruder (24/1) equipped with a 2 inch barrier mixing screw containing a Maddock shear mixing tip, and a 4 inch diameter die. All of the films had excellent dead-fold properties. The polymer blends of Examples 10-12 were also extruded into sheets using a single screw extruder and a 14 inch flat cast-film die, and the usual nip-rolls and film take-up assembly normal to such a system. All of these films also had excellent dead-fold properties.

Examples 13-61

Blown and cast films and sheets were manufactured from biodegradable polymer blends having the following mix designs, with the concentrations being expressed in term of weight percent of the entire polymer blend:

| Example | PLA | Biomax | Ecoflex BX 7000 | Eastar Bio Ultra | Eastar Bio GP | CaCO$_3$ | TiO$_2$ | Starch |
|---|---|---|---|---|---|---|---|---|
| 13 | 30% | 0% | 45% | 0% | 8.25% | 14.5% | 2.25% | 0% |
| 14 | 30% | 0% | 30% | 0% | 13.2% | 23.2% | 3.6% | 0% |
| 15 | 30% | 0% | 25% | 0% | 11.55% | 20.3% | 3.15% | 10% |
| 16 | 50% | 0% | 25% | 0% | 8.25% | 14.5% | 2.25% | 0% |
| 17 | 50% | 0% | 10% | 0% | 13.2% | 23.2% | 3.6% | 0% |
| 18 | 50% | 0% | 5% | 0% | 11.55% | 20.3% | 3.15% | 10% |
| 19 | 50% | 0% | 0% | 0% | 16.5% | 29.0% | 4.5% | 0% |
| 20 | 50% | 0% | 0% | 0% | 13.2% | 23.2% | 3.6% | 10% |
| 21 | 50% | 0% | 0% | 0% | 11.55% | 20.3% | 3.2% | 15% |
| 22 | 50% | 0% | 0% | 0% | 9.9% | 17.4% | 2.7% | 20% |
| 23 | 50% | 0% | 0% | 0% | 8.25% | 14.5% | 2.25% | 25% |
| 24 | 27% | 0% | 64% | 0% | 2.97% | 5.22% | 0.81% | 0% |
| 25 | 25% | 0% | 58% | 0% | 5.61% | 9.86% | 1.53% | 0% |
| 26 | 23% | 0% | 54% | 0% | 7.59% | 13.34% | 2.07% | 0% |
| 27 | 30% | 0% | 40% | 0% | 0% | 0.0% | 0.0% | 30% |
| 28 | 15% | 0% | 60% | 0% | 0% | 0.0% | 0.0% | 25% |
| 29 | 25% | 0% | 25% | 0% | 16.5% | 29.0% | 4.5% | 0% |
| 30 | 20% | 0% | 20% | 0% | 19.8% | 34.8% | 5.4% | 0% |
| 31 | 35% | 0% | 5% | 0% | 19.8% | 34.8% | 5.4% | 0% |
| 32 | 40% | 0% | 10% | 0% | 16.5% | 29.0% | 4.5% | 0% |
| 33 | 50% | 0% | 0% | 0% | 16.5% | 29.0% | 4.5% | 0% |
| 34 | 20% | 0% | 0% | 20% | 19.8% | 34.8% | 5.4% | 0% |
| 35 | 27% | 0% | 36% | 0% | 3.3% | 5.8% | 0.9% | 27% |
| 36 | 21% | 0% | 28% | 0% | 9.9% | 17.4% | 2.7% | 21% |
| 37 | 28.5% | 0% | 38% | 5% | 0% | 0% | 0% | 28.5% |
| 38 | 40% | 0% | 0% | 7% | 16.5% | 29.0% | 4.5% | 3% |
| 39 | 40% | 0% | 7% | 0% | 16.5% | 29.0% | 4.5% | 3% |
| 40 | 50% | 0% | 0% | 0% | 16.5% | 29.0% | 4.5% | 0% |
| 41 | 20% | 0% | 0% | 20% | 19.8% | 34.8% | 5.4% | 0% |
| 42 | 30% | 0% | 0% | 14% | 16.5% | 29.0% | 4.5% | 6% |
| 43 | 40% | 0% | 0% | 14% | 13.2% | 23.2% | 3.6% | 6% |
| 44 | 0% | 40% | 0% | 14% | 13.2% | 23.2% | 3.6% | 6% |
| 45 | 0% | 50% | 0% | 0% | 16.5% | 29.0% | 4.5% | 0% |
| 46 | 0% | 45% | 0% | 0% | 18.15% | 31.9% | 4.95% | 0% |
| 47 | 0% | 40% | 0% | 0% | 19.8% | 34.8% | 5.4% | 0% |

-continued

| Example | PLA | Biomax | Ecoflex BX 7000 | Eastar Bio Ultra | Eastar Bio GP | CaCO₃ | TiO₂ | Starch |
|---|---|---|---|---|---|---|---|---|
| 48 | 0% | 40% | 0% | 0% | 19.8% | 34.8% | 5.4% | 0% |
| 49 | 40% | 0% | 14% | 0% | 13.2% | 23.2% | 3.6% | 6% |
| 50 | 0% | 30% | 0% | 7% | 19.8% | 34.8% | 5.4% | 3% |
| 51 | 0% | 35% | 0% | 7% | 18.15% | 31.9% | 4.95% | 3% |
| 52 | 0% | 38% | 0% | 1.4% | 19.8% | 34.8% | 5.4% | 0.6% |
| 53 | 0% | 35% | 0% | 3.5% | 19.8% | 34.8% | 5.4% | 1.5% |
| 54 | 40% | 0% | 0% | 14% | 13.2% | 23.2% | 3.6% | 6% |
| 55 | 40% | 0% | 0% | 0% | 26.7% | 22.7% | 3.5% | 7.1% |
| 56 | 40% | 0% | 0% | 13.8% | 12.9% | 22.7% | 3.5% | 7.1% |
| 57 | 40% | 0% | 0% | 26.7% | 0% | 22.7% | 3.5% | 7.1% |
| 58 | 40% | 0% | 0% | 13.8% | 12.9% | 22.7% | 3.5% | 7.1% |
| 59 | 40% | 0% | 0% | 0% | 26.7% | 22.7% | 3.5% | 7.1% |
| 60 | 40% | 0% | 0% | 14% | 13.2% | 23.2% | 3.6% | 6% |
| 61 | 0% | 50% | 0% | 0% | 16.5% | 29.0% | 4.5% | 0% |

The compositions of Examples 13-59 were all processed and blown into films using a COLLIN Blown Film Extruder. The films made using the compositions of Examples 30-34, 36, 38, 41 and 43 were tested and found to have dead-folds of 100%, 92%, 92%, 91%, 100%, 100%, 100%, 100% and 100%, respectively. Although films made from the other compositions were not tested for dead-fold, they would be expected to have relatively high dead-fold compared to conventional biopolymers (i.e., at least about 80%). The water vapor transmission rate for films made using the compositions of Examples 36, 38, 41 and 43 were 91.94, 91.32, 98.29 and 80.31 g/m²/day, respectively.

The composition of Example 60 was processed and blown into a film using a BATTENFELD-GLOUCESTER Blown Film Extruder. A film made from this composition was found to have a water vapor transmission rate of 42.48 g/m²/day.

The composition of Example 61 was processed and blown into various films using both a BATTENFELD-GLOUCESTER Blown Film Extruder and a BLACK-CLAWSON Cast Film Extruder. The film formed using the BATTENFELD-GLOUCESTER Blown Film Extruder apparatus was tested and found to have a dead-fold of 100%. Two different thicknesses of films were formed using the BLACK-CLAWSON Cast Film Extruder, one having a thickness of 1.3 mils (0.0013") and another having a thickness of 1.8 mils (0.0018"). Both had a distinctive machine direction orientation because they were cast, rather than blown, films. The 1.3 mil film had a dead-fold of 99%, and the 1.8 mil film had a dead-fold of 100%.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An article of manufacture that is adapted for use as a food wrap that is both resistant to liquids and biodegradable comprising a biodegradable sheet or film having a single layer formed by extruding, blowing or casting a thermoplastic melt formed from a biodegradable thermoplastic composition that includes:
   (i) at least one thermoplastic biodegradable polymer; and
   (ii) at least one type of filler particles,
   wherein the sheet or film is stretched during processing so as to result in cavitation comprising tiny cavities in the vicinity of the filler particles,
   wherein the sheet or film is thin and flexible so as to be easily wrapped around a food item and possesses sufficient dead-fold that it will remain wrapped around the food item absent application of an external force,
   wherein the sheet or film, prior to being used to wrap a food item, includes a first exposed surface that contacts the food item when wrapped around the food item and a second exposed surface on a side of the sheet or film opposite the first exposed surface.

2. An article of manufacture as defined in claim 1, wherein the filler particles comprise at least one of inorganic filler particles and organic filler particles.

3. An article of manufacture as defined in claim 2, wherein the inorganic filler particles have a concentration greater than about 10% by weight of the biodegradable thermoplastic composition.

4. An article of manufacture as defined in claim 2, wherein the inorganic filler particles have a concentration greater than about 20% by weight of the biodegradable thermoplastic composition.

5. An article of manufacture as defined in claim 2, wherein the inorganic filler particles have a concentration greater than about 30% by weight of the biodegradable thermoplastic composition.

6. An article of manufacture as defined in claim 1, wherein the sheet or film has dead-fold of at least about 50%.

7. An article of manufacture as defined in claim 1, wherein the sheet or film has dead-fold of at least about 70%.

8. An article of manufacture as defined in claim 1, wherein the sheet or film has dead-fold of at least about 80%.

9. An article of manufacture as defined in claim 1, wherein the sheet or film has a measured thickness in a range of about 0.0003" to about 0.01".

10. An article of manufacture as defined in claim 1, wherein the sheet or film has a measured thickness in a range of about 0.0005" to about 0.003".

11. An article of manufacture as defined in claim 1, wherein the sheet or film has a measured thickness in a range of about 0.001" to about 0.002".

12. An article of manufacture as defined in claim 1, wherein the sheet or film has a moisture vapor transmission rate of at least about 80 g/m²/day.

13. An article of manufacture as defined in claim 1, wherein the biodegradable thermoplastic composition includes at least one stiff thermoplastic biodegradable polymer and at least one soft thermoplastic biodegradable polymer, and optionally at least one of fibers or a nonbiodegradable polymer.

14. An article of manufacture as defined in claim 13, wherein at least a portion of the soft thermoplastic biodegradable polymer comprises thermoplastic starch that is free of plasticizers.

15. An article of manufacture as defined in claim 13, wherein the stiff thermoplastic biodegradable polymer comprises at least one stiff synthetic biodegradable polymer and wherein the soft thermoplastic biodegradable polymer comprises at least one soft synthetic biodegradable polymer.

16. An article of manufacture as defined in claim 1, wherein at least a portion of the filler particles protrude from a surface of the sheet or film.

17. An article of manufacture as defined in claim 16, wherein the particles that protrude from the surface of the sheet or film have particle size diameters that are greater than the thickness of the sheet or film.

18. A sheet or film adapted for use as a food wrap that is both resistant to liquids and biodegradable, wherein the sheet or film is formed by extruding, blowing or casting a thermoplastic melt formed from a biodegradable thermoplastic composition that comprises at least one hydrophobic thermoplastic biodegradable polymer, wherein the sheet or film is textured by a knurled or embossing-type roller so as to have dead-fold of at least about 70%,
wherein the sheet or film is thin and flexible so as to be easily wrapped around a food item and possesses sufficient dead-fold that it will remain wrapped around the food item absent application of an external force,
wherein the sheet or film, prior to being used to wrap a food item, includes a first exposed surface that contacts the food item when wrapped around the food item and a second exposed surface on a side of the sheet or film opposite the first exposed surface.

19. A sheet or film as defined in claim 18, wherein the textured sheet or film has dead-fold of at least about 80%.

20. A sheet or film as defined in claim 18, wherein the biodegradable thermoplastic composition comprises at least one stiff thermoplastic biodegradable polymer and at least one soft synthetic thermoplastic biodegradable polymer.

21. A sheet or film adapted for use as a food wrap that is both resistant to liquids and biodegradable, wherein the sheet or film is formed as a single layer by extruding, blowing or casting a thermoplastic melt formed from a biodegradable thermoplastic composition that comprises at least one thermoplastic biodegradable polymer and at least one type of filler particles included in an amount so that the sheet or film has dead-fold of at least about 70%, wherein the sheet or film is water-resistant and biodegradable,
wherein the sheet or film is thin and flexible so as to be easily wrapped around a food item and possesses sufficient dead-fold that it will remain wrapped around the food item absent application of an external force,
wherein the sheet or film, prior to being used to wrap a food item, includes a first exposed surface that contacts the food item when wrapped around the food item and a second exposed surface on a side of the sheet or film opposite the first exposed surface.

22. A sheet or film as defined in claim 21, wherein the sheet or film has dead-fold of at least about 80%.

23. A sheet or film as defined in claim 21, wherein the sheet or film has dead-fold of about 100%.

24. A sheet or film as defined in claim 21, wherein the filler particles are included in an amount greater than about 10% by weight of the biodegradable thermoplastic composition.

25. A sheet or film as defined in claim 21, wherein the filler particles are included in an amount greater than about 20% by weight of the biodegradable thermoplastic composition.

26. A sheet or film as defined in claim 21, wherein the filler particles are included in an amount greater than about 30% by weight of the biodegradable thermoplastic composition.

27. A sheet or film as defined in claim 21, wherein the biodegradable thermoplastic composition comprises at least one stiff synthetic hydrophobic thermoplastic biodegradable polymer and at least one soft synthetic thermoplastic biodegradable polymer.

28. A sheet or film as defined in claim 21, wherein at least a portion of the filler particles protrude from a surface of the sheet or film.

29. An article of manufacture comprising a single layer biodegradable sheet or film adapted for use as a food wrap that is both resistant to liquids and biodegradable, wherein the sheet or film is formed by extruding, blowing or casting a biodegradable thermoplastic composition that comprises at least one thermoplastic biodegradable polymer and at least one type of filler particles, wherein at least a portion of the filler particles protrude from a surface of the sheet or film,
wherein the sheet or film is thin and flexible so as to be easily wrapped around a food item and possesses sufficient dead-fold that it will remain wrapped around the food item absent application of an external force,
wherein the sheet or film, prior to being used to wrap a food item, includes a first exposed surface that contacts the food item when wrapped around the food item and a second exposed surface on a side of the sheet or film opposite the first exposed surface.

30. An article of manufacture as defined in claim 29, wherein the filler particles comprise at least one type of inorganic filler particles, and wherein the sheet or film is stretched during processing so as to result in cavitation comprising tiny cavities in the vicinity of the filler particles.

31. An article of manufacture as defined in claim 29, wherein at least a portion of the filler particles have particle size diameters that exceed the thickness of the sheet or film.

32. An article of manufacture as defined in claim 29, wherein at least a portion of the thermoplastic biodegradable polymer comprises at least one stiff synthetic thermoplastic biodegradable polymer and at least one soft synthetic thermoplastic biodegradable polymer.

33. An article of manufacture comprising a single layer film or sheet formed by extrusion, blowing or casting a thermoplastic melt formed from a biodegradable thermoplastic composition comprising:
at least one stiff thermoplastic biodegradable polymer having a glass transition temperature greater than about 10° C.; and
at least one soft thermoplastic biodegradable polymer having a glass transition temperature less than about 0° C.,
at least a portion of the soft thermoplastic biodegradable polymer comprising an aliphatic-aromatic copolyester, the biodegradable thermoplastic composition including starch that is free of plasticizers and that retains a substantial portion of its crystallinity in order for the starch to (i) act as a filler within the film or sheet and/or (ii) act as a stiff thermoplastic polymer within the film or sheet and/or (iii) impart dead-fold to the film or sheet.

34. An article of manufacture as defined in claim 33, wherein the film or sheet has dead-fold of at least about 70%.

35. An article of manufacture as defined in claim 33, wherein the film or sheet has dead-fold of at least about 80%.

* * * * *

UNITED STATES PATENT AND TRADEMARK OFFICE
CERTIFICATE OF CORRECTION

PATENT NO. : 7,297,394 B2
APPLICATION NO. : 10/087718
DATED : November 20, 2007
INVENTOR(S) : Kishan Khemani It is certified that error appears in the above-identified patent and that said Letters Patent is hereby corrected as shown below:

Col. 10
Line 39 change "have" to --that have--

Col. 15
Line 48 change "have" to --to have--

Col. 18
Line 40 change "proving" to --providing--

Col. 27
Line 59 change "as well" to --as well as--

Signed and Sealed this

Sixth Day of October, 2009

David J. Kappos
*Director of the United States Patent and Trademark Office*